(12) United States Patent
Sinclair

(10) Patent No.: US 10,055,147 B2
(45) Date of Patent: *Aug. 21, 2018

(54) SYSTEMS AND METHODS FOR A MASS DATA STORAGE SYSTEM HAVING A FILE-BASED INTERFACE TO A HOST AND A NON-FILE-BASED INTERFACE TO SECONDARY STORAGE

(71) Applicant: SanDisk Technologies LLC, Plano, TX (US)

(72) Inventor: Alan W. Sinclair, Edmonton (GB)

(73) Assignee: SANDISK TECHNOLOGIES LLC, Plano, TX (US)

( * ) Notice: Subject to any disclaimer, the term of this patent is extended or adjusted under 35 U.S.C. 154(b) by 298 days.

This patent is subject to a terminal disclaimer.

(21) Appl. No.: 14/815,886

(22) Filed: Jul. 31, 2015

(65) Prior Publication Data

US 2015/0363135 A1    Dec. 17, 2015

Related U.S. Application Data

(62) Division of application No. 11/196,826, filed on Aug. 3, 2005, now Pat. No. 9,104,315.

(51) Int. Cl.
*G06F 3/06* (2006.01)
*G06F 12/02* (2006.01)
(Continued)

(52) U.S. Cl.
CPC ............ *G06F 3/0619* (2013.01); *G06F 3/064* (2013.01); *G06F 3/0607* (2013.01);
(Continued)

(58) Field of Classification Search
CPC ......... G06F 12/0866; G06F 2212/2022; G06F 3/0607; G06F 3/064; G06F 3/0679;
(Continued)

(56) References Cited

U.S. PATENT DOCUMENTS 4,761,737 A    8/1988   Duvall et al.
4,800,520 A    1/1989   Iijima
(Continued)

FOREIGN PATENT DOCUMENTS

CN        1466060 A         1/2004
EP     0 564 699 A1        10/1993
(Continued)

OTHER PUBLICATIONS

Notice of Allowance and Fee(s) Due for U.S. Appl. No. 11/196,826 (dated Apr. 3, 2015).
(Continued)

*Primary Examiner* — Yaima Rigol
(74) *Attorney, Agent, or Firm* — Kunzler, PC

(57) ABSTRACT

System and method for transferring data between a host system and a data storage system is provided. The system includes an interface that uses a file based protocol to transfer data between the data storage system and the host system, wherein the data storage system includes a first mass storage device and a second mass storage device; wherein the first mass storage device is a solid state non-volatile memory device and the second mass storage device is a non-solid state memory device. The first mass storage device is a flash memory device that operates as a primary storage device that stores data on a file by file basis. The second mass storage device is a magnetic disk drive that operates as secondary storage device and stores data received via a logical interface.

15 Claims, 25 Drawing Sheets

(51) Int. Cl.
  *G06F 12/0868* (2016.01)
  *G06F 12/0866* (2016.01)

(52) U.S. Cl.
  CPC .......... *G06F 3/0611* (2013.01); *G06F 3/0643* (2013.01); *G06F 3/0679* (2013.01); *G06F 3/0685* (2013.01); *G06F 12/0246* (2013.01); *G06F 12/0868* (2013.01); *G06F 12/0866* (2013.01); *G06F 2201/845* (2013.01); *G06F 2212/205* (2013.01); *G06F 2212/2022* (2013.01); *G06F 2212/7201* (2013.01)

(58) Field of Classification Search
  CPC ............. G06F 12/0246; G06F 12/0868; G06F 2201/845; G06F 2212/205; G06F 2212/7201; G06F 3/0611; G06F 3/0619; G06F 3/0643; G06F 3/0685; H05B 33/0854; H05B 33/0872; H05B 37/0218; H05B 37/0272
  USPC ......................................... 711/2, 5, 103, 115
  See application file for complete search history.

(56) References Cited

U.S. PATENT DOCUMENTS

| | | | |
|---|---|---|---|
| 4,802,117 A | 1/1989 | Chrosny et al. |
| 4,896,262 A | 1/1990 | Wayama et al. |
| 5,226,155 A | 7/1993 | Iijima |
| 5,369,754 A | 11/1994 | Fandrick et al. |
| 5,388,083 A | 2/1995 | Assar et al. |
| 5,404,485 A | 4/1995 | Ban |
| 5,530,673 A | 6/1996 | Tobita et al. |
| 5,542,066 A | 7/1996 | Mattson et al. |
| 5,544,356 A | 8/1996 | Robinson et al. |
| 5,570,315 A | 10/1996 | Tanaka et al. |
| 5,586,291 A | 12/1996 | Lasker et al. |
| 5,592,662 A | 1/1997 | Sawada et al. |
| 5,592,669 A | 1/1997 | Robinson et al. |
| 5,602,987 A | 2/1997 | Harari et al. |
| 5,619,690 A | 4/1997 | Matsumani et al. |
| 5,628,014 A | 5/1997 | Cecchini et al. |
| 5,634,050 A | 5/1997 | Krueger et al. |
| 5,636,355 A | 6/1997 | Ramakrishnan et al. |
| 5,708,846 A | 1/1998 | Ryan |
| 5,754,888 A | 5/1998 | Yang et al. |
| 5,774,397 A | 6/1998 | Endoh et al. |
| 5,778,418 A | 7/1998 | Auclair et al. |
| 5,787,493 A | 7/1998 | Niijima et al. |
| 5,798,968 A | 8/1998 | Lee et al. |
| 5,799,168 A | 8/1998 | Ban |
| 5,809,543 A | 9/1998 | Byers et al. |
| 5,809,558 A | 9/1998 | Matthews et al. |
| 5,832,493 A | 11/1998 | Marshall et al. |
| 5,848,420 A | 12/1998 | Xu |
| 5,867,641 A | 2/1999 | Jenett |
| 5,890,192 A | 3/1999 | Lee et al. |
| 5,896,393 A | 4/1999 | Yard et al. |
| 5,907,854 A | 5/1999 | Kerns |
| 5,928,347 A | 7/1999 | Jones |
| 5,933,846 A | 8/1999 | Endo |
| 5,937,425 A | 8/1999 | Ban |
| 5,953,538 A | 9/1999 | Duncan et al. |
| 5,966,720 A | 10/1999 | Itoh et al. |
| 5,973,964 A | 10/1999 | Koh et al. |
| 5,978,893 A | 11/1999 | Bakshi et al. |
| 5,987,478 A | 11/1999 | See et al. |
| 5,996,047 A | 11/1999 | Peacock |
| 6,014,724 A | 1/2000 | Jenett |
| 6,016,530 A | 1/2000 | Auclair et al. |
| 6,021,415 A | 2/2000 | Cannon |
| 6,038,636 A | 3/2000 | Brown, III et al. |
| 6,046,935 A | 4/2000 | Takeuchi et al. |
| 6,069,827 A | 5/2000 | Sinclair |
| 6,078,520 A | 6/2000 | Tobita et al. |
| 6,094,693 A | 7/2000 | Haneda |
| 6,145,069 A | 11/2000 | Dye |
| 6,148,354 A | 11/2000 | Ban et al. |
| 6,216,204 B1 | 4/2001 | Thiriet |
| 6,223,271 B1 | 4/2001 | Cepulis |
| 6,226,728 B1 | 5/2001 | See et al. |
| 6,256,690 B1 | 7/2001 | Carper |
| 6,275,436 B1 | 8/2001 | Tobita et al. |
| 6,275,804 B1 | 8/2001 | Carl et al. |
| 6,279,069 B1 | 8/2001 | Robinson et al. |
| 6,286,056 B1 | 9/2001 | Edgar et al. |
| 6,286,256 B1 | 9/2001 | Weder |
| 6,351,787 B2 | 2/2002 | Katayama et al. |
| 6,370,614 B1 | 4/2002 | Teoman et al. |
| 6,373,746 B1 | 4/2002 | Takeuchi et al. |
| 6,380,597 B1 | 4/2002 | Gudesen et al. |
| 6,385,690 B1 | 5/2002 | Iida et al. |
| 6,389,433 B1 | 5/2002 | Bolosky et al. |
| 6,408,357 B1 | 6/2002 | Hanmann et al. |
| 6,412,040 B2 | 6/2002 | Hasbun et al. |
| 6,421,279 B1 | 7/2002 | Tobita et al. |
| 6,424,486 B2 | 7/2002 | Heaton et al. |
| 6,426,893 B1 | 7/2002 | Conley et al. |
| 6,427,186 B1 | 7/2002 | Lin et al. |
| 6,446,140 B1 | 9/2002 | Nozu |
| 6,456,528 B1 | 9/2002 | Chen |
| 6,466,973 B2 | 10/2002 | Jaffe |
| 6,467,015 B1 | 10/2002 | Nolan et al. |
| 6,467,021 B1 | 10/2002 | Sinclair |
| 6,467,022 B1 | 10/2002 | Buckland et al. |
| 6,477,616 B1 | 11/2002 | Takahashi |
| 6,480,935 B1 | 11/2002 | Carper et al. |
| 6,484,937 B1 | 11/2002 | Devaux et al. |
| 6,490,649 B2 | 12/2002 | Sinclair |
| 6,493,811 B1 | 12/2002 | Blades et al. |
| 6,504,846 B1 | 1/2003 | Yu et al. |
| 6,522,580 B2 | 2/2003 | Chen et al. |
| 6,535,949 B1 | 3/2003 | Parker |
| 6,542,407 B1 | 4/2003 | Chen et al. |
| 6,547,150 B1 | 4/2003 | Deo et al. |
| 6,567,307 B1 | 5/2003 | Estakhri |
| 6,598,114 B2 | 7/2003 | Funakoshi |
| 6,604,168 B2 | 8/2003 | Ogawa |
| 6,631,453 B1 | 10/2003 | Friday |
| 6,631,456 B2 | 10/2003 | Leighnor et al. |
| 6,643,188 B2 | 11/2003 | Tanaka et al. |
| 6,646,948 B1 | 11/2003 | Stence et al. |
| 6,667,932 B2 | 12/2003 | Roohparvar et al. |
| 6,668,336 B2 | 12/2003 | Lasser |
| 6,681,239 B1 | 1/2004 | Munroe et al. |
| 6,728,851 B1 | 4/2004 | Estakhri et al. |
| 6,748,457 B2 | 6/2004 | Fallon et al. |
| 6,763,424 B2 | 7/2004 | Conley |
| 6,766,432 B2 | 7/2004 | Saltz |
| 6,771,536 B2 | 8/2004 | Li et al. |
| 6,772,955 B2 | 8/2004 | Yoshimoto et al. |
| 6,779,063 B2 | 8/2004 | Yamamoto |
| 6,781,877 B2 | 8/2004 | Cernea et al. |
| 6,798,710 B2 | 9/2004 | Roohparvar et al. |
| 6,804,730 B1 | 10/2004 | Kawashima |
| 6,804,749 B2 | 10/2004 | Chien et al. |
| 6,810,462 B2 | 10/2004 | Matsunami et al. |
| 6,823,417 B2 | 11/2004 | Spencer |
| 6,834,331 B1 | 12/2004 | Liu |
| 6,839,823 B1 | 1/2005 | See et al. |
| 6,842,843 B1 | 1/2005 | Vishlitzky et al. |
| 6,845,385 B1 | 1/2005 | Hennessey |
| 6,865,659 B2 | 3/2005 | Montemayor |
| 6,877,074 B2 | 4/2005 | Naitoh et al. |
| 6,883,114 B2 | 4/2005 | Lasser |
| 6,886,083 B2 | 4/2005 | Murakami |
| 6,896,464 B1 | 5/2005 | Chow et al. |
| 6,898,662 B2 | 5/2005 | Gorobets |
| 6,925,007 B2 | 8/2005 | Harari et al. |
| 6,938,116 B2 | 8/2005 | Kim et al. |
| 6,965,963 B1 | 11/2005 | Nakanishi et al. |
| 7,003,553 B2 | 2/2006 | Kanai et al. |
| 7,032,065 B2 | 4/2006 | Gonzalez et al. |
| 7,035,949 B2 | 4/2006 | Bychkov et al. |

(56) References Cited

U.S. PATENT DOCUMENTS

| | | |
|---|---|---|
| 7,092,911 B2 | 8/2006 | Yokota et al. |
| 7,127,549 B2 | 10/2006 | Sinclair |
| 7,136,973 B2 | 11/2006 | Sinclair |
| 7,193,899 B2 | 3/2007 | Eggleston et al. |
| 7,251,747 B1 | 7/2007 | Bean et al. |
| 7,627,733 B2 | 12/2009 | Sinclair |
| 7,877,539 B2 | 1/2011 | Sinclair et al. |
| 8,209,516 B2 | 6/2012 | Sinclair |
| 9,104,315 B2 | 8/2015 | Sinclair |
| 2001/0034809 A1 | 10/2001 | Ogawa |
| 2001/0052038 A1 | 12/2001 | Fallon et al. |
| 2002/0069354 A1 | 6/2002 | Fallon et al. |
| 2002/0078002 A1 | 6/2002 | Bottomley et al. |
| 2002/0083280 A1 | 6/2002 | Naitoh et al. |
| 2002/0099904 A1 | 7/2002 | Conley |
| 2002/0166023 A1 | 11/2002 | Nolan et al. |
| 2002/0178143 A1 | 11/2002 | Fujimoto |
| 2002/0184436 A1 | 12/2002 | Kim et al. |
| 2002/0188592 A1 | 12/2002 | Leonhardt et al. |
| 2003/0002432 A1 | 1/2003 | Morris et al. |
| 2003/0026186 A1 | 2/2003 | Ando et al. |
| 2003/0065866 A1 | 4/2003 | Spencer |
| 2003/0065876 A1 | 4/2003 | Lasser |
| 2003/0065899 A1 | 4/2003 | Gorobets |
| 2003/0088812 A1 | 5/2003 | Lasser |
| 2003/0109093 A1 | 6/2003 | Harari et al. |
| 2003/0128619 A1 | 7/2003 | Roohparvar et al. |
| 2003/0135514 A1 | 7/2003 | Patel et al. |
| 2003/0147278 A1 | 8/2003 | Tanaka et al. |
| 2003/0208501 A1 | 11/2003 | Walter et al. |
| 2003/0229753 A1 | 12/2003 | Hwang |
| 2003/0229769 A1 | 12/2003 | Montemayor |
| 2004/0019716 A1 | 1/2004 | Bychkov et al. |
| 2004/0019736 A1 | 1/2004 | Kim |
| 2004/0019761 A1 | 1/2004 | Fukuzumi |
| 2004/0024921 A1 | 2/2004 | Peake, Jr. et al. |
| 2004/0028068 A1 | 2/2004 | Kizhepat |
| 2004/0030693 A1 | 2/2004 | Toda |
| 2004/0040018 A1 | 2/2004 | Fleming et al. |
| 2004/0044873 A1 | 3/2004 | Wong et al. |
| 2004/0073627 A1 | 4/2004 | Amano |
| 2004/0073727 A1 | 4/2004 | Moran et al. |
| 2004/0103241 A1 | 5/2004 | Chang et al. |
| 2004/0123020 A1 | 6/2004 | Gonzalez et al. |
| 2004/0133718 A1 | 7/2004 | Kodama et al. |
| 2004/0157638 A1 | 8/2004 | Moran et al. |
| 2004/0186946 A1 | 9/2004 | Lee |
| 2004/0205289 A1 | 10/2004 | Srinivasan |
| 2004/0205301 A1 | 10/2004 | Hara et al. |
| 2004/0207512 A1 | 10/2004 | Bastian, II |
| 2004/0248612 A1 | 12/2004 | Lee |
| 2005/0018527 A1 | 1/2005 | Gorobets |
| 2005/0021657 A1 | 1/2005 | Negishi et al. |
| 2005/0055497 A1 | 3/2005 | Estakhri et al. |
| 2005/0086241 A1 | 4/2005 | Ram |
| 2005/0086422 A1 | 4/2005 | Wong et al. |
| 2005/0108487 A1 | 5/2005 | Kobayashi et al. |
| 2005/0125600 A1 | 6/2005 | Ehrlich |
| 2005/0125602 A1 | 6/2005 | Ehrlich |
| 2005/0125603 A1 | 6/2005 | Ehrlich |
| 2005/0141312 A1 | 6/2005 | Sinclair et al. |
| 2005/0141313 A1 | 6/2005 | Gorobets et al. |
| 2005/0144357 A1 | 6/2005 | Sinclair |
| 2005/0144358 A1 | 6/2005 | Conley et al. |
| 2005/0144360 A1 | 6/2005 | Bennett et al. |
| 2005/0144363 A1 | 6/2005 | Sinclair |
| 2005/0144365 A1 | 6/2005 | Gorobets et al. |
| 2005/0144367 A1 | 6/2005 | Sinclair |
| 2005/0166087 A1 | 7/2005 | Gorobets |
| 2005/0172067 A1 | 8/2005 | Sinclair |
| 2005/0172074 A1 | 8/2005 | Sinclair |
| 2005/0223166 A1 | 10/2005 | Kanai et al. |
| 2006/0004951 A1 | 1/2006 | Rudelic et al. |
| 2006/0020744 A1 | 1/2006 | Sinclair et al. |
| 2006/0020745 A1 | 1/2006 | Conley et al. |
| 2006/0031593 A1 | 2/2006 | Sinclair |
| 2006/0047880 A1 | 3/2006 | Lindblom et al. |
| 2006/0061953 A1 | 3/2006 | Le |
| 2006/0087957 A1 | 4/2006 | Kelly et al. |
| 2006/0143365 A1 | 6/2006 | Kikuchi |
| 2006/0155920 A1 | 7/2006 | Smith et al. |
| 2006/0155921 A1 | 7/2006 | Gorobets et al. |
| 2006/0155922 A1 | 7/2006 | Gorobets et al. |
| 2006/0161724 A1 | 7/2006 | Bennett et al. |
| 2006/0161728 A1 | 7/2006 | Bennett et al. |
| 2006/0168392 A1 | 7/2006 | Hwang |
| 2006/0168395 A1 | 7/2006 | Deng et al. |
| 2006/0184718 A1 | 8/2006 | Sinclair et al. |
| 2006/0184719 A1 | 8/2006 | Sinclair |
| 2006/0184720 A1 | 8/2006 | Sinclair et al. |
| 2006/0184722 A1 | 8/2006 | Sinclair |
| 2006/0184723 A1 | 8/2006 | Sinclair et al. |
| 2007/0014136 A1 | 1/2007 | Ali et al. |
| 2007/0030734 A1 | 2/2007 | Sinclair et al. |
| 2007/0033323 A1 | 2/2007 | Gorobets |
| 2007/0033324 A1 | 2/2007 | Sinclair |
| 2007/0033326 A1 | 2/2007 | Sinclair |
| 2007/0033328 A1 | 2/2007 | Sinclair et al. |
| 2007/0033329 A1 | 2/2007 | Sinclair et al. |
| 2007/0033330 A1 | 2/2007 | Sinclair et al. |
| 2007/0033332 A1 | 2/2007 | Sinclair et al. |
| 2007/0033362 A1 | 2/2007 | Sinclair |
| 2007/0033373 A1 | 2/2007 | Sinclair |
| 2007/0033374 A1 | 2/2007 | Sinclair et al. |
| 2007/0143532 A1 | 6/2007 | Gorobets et al. |
| 2007/0143570 A1 | 6/2007 | Gorobets et al. |
| 2007/0143571 A1 | 6/2007 | Sinclair et al. |
| 2008/0259751 A1* | 10/2008 | Nakamura ......... G11B 20/1217 369/47.13 |
| 2015/0363131 A1 | 12/2015 | Sinclair |

FOREIGN PATENT DOCUMENTS

| | | |
|---|---|---|
| EP | 0 702 305 | 3/1996 |
| EP | 1 054 319 A2 | 11/2002 |
| EP | 1 100 001 | 8/2003 |
| EP | 1 357 463 A2 | 10/2003 |
| EP | 1 571 557 | 9/2005 |
| EP | 1 851 638 | 8/2006 |
| EP | 1 875 334 | 8/2006 |
| EP | 1 920 316 | 2/2007 |
| JP | 11-161527 | 6/1999 |
| JP | 2000-040026 | 2/2000 |
| JP | 2005 122439 | 5/2005 |
| JP | 5178514 | 1/2013 |
| JP | 5236469 | 4/2013 |
| KR | 10-1369996 | 2/2014 |
| KR | 10-1449543 | 10/2014 |
| TW | 1234070 | 6/2005 |
| TW | I327274 | 7/2010 |
| TW | I350968 | 10/2011 |
| TW | I352901 | 11/2011 |
| WO | WO 1997/12324 | 4/1997 |
| WO | WO 97/50035 | 12/1997 |
| WO | WO 00/49488 | 8/2000 |
| WO | WO 02/19334 A2 | 3/2002 |
| WO | WO 2002/023341 A1 | 3/2002 |
| WO | WO 2002/029575 A2 | 4/2002 |
| WO | WO 2002/058074 A2 | 7/2002 |
| WO | WO 2004/012027 A2 | 2/2004 |
| WO | WO 2004/040453 A2 | 5/2004 |
| WO | WO 2004/040455 A2 | 5/2004 |
| WO | WO 2004/046937 A1 | 6/2004 |
| WO | WO 2005/066792 A2 | 7/2005 |
| WO | WO 2005/081097 A2 | 9/2005 |
| WO | WO 2006/088719 A2 | 8/2006 |
| WO | WO 2006/088723 A | 8/2006 |
| WO | WO 2006/088727 A2 | 8/2006 |
| WO | WO 2007/019075 A2 | 2/2007 |
| WO | WO 2007/076378 A2 | 7/2007 |
| WO | WO 2007/079358 A2 | 7/2007 |

(56) References Cited

OTHER PUBLICATIONS

Communication pursuant to Article 94(3) EPC for European Application No. 06 788 725.7 (Oct. 16, 2014).
Decision to Grant for Korean Application No. 10-2008-7005263 (dated Jul. 29, 2014).
Final Office Action for U.S. Appl. No. 11/196,826 (dated Aug. 19, 2014).
Non-Final Office Action for U.S. Appl. No. 11/196,826 (dated Apr. 11, 2014).
Notice of Preliminary Rejection for Korean Patent Application No. 2008-7005263 (dated Jan. 29, 2014).
Decision to Grant for Korean Application No. 10-2008-7005250 (dated Dec. 12, 2013).
Final Office Action for U.S. Appl. No. 11/196,826 (dated Nov. 14, 2013).
Notice of Preliminary Rejection for Korean Patent Application No. 2008-7005250 (dated Mar. 29, 2013).
Notice of Allowance for Japanese Patent Application No. 2008-525047 (dated Mar. 5, 2013).
Non-Final Office Action for U.S. Appl. No. 11/196,826 (dated Mar. 11, 2013).
Notice of Preliminary Rejection for Korean Patent Application No. 2008-7005263 (dated Feb. 18, 2013).
Decision of Refusal for Japanese Patent Application No. 2008-525047 (dated Jul. 31, 2012).
Interview Summary for U.S. Appl. No. 11/196,826 (dated Nov. 30, 2011).
First Office Action for Japanese Patent Application No. 2008-525047 (dated Nov. 8, 2011).
First Office Action for Japanese Patent Application No. 2008-525046 (dated Nov. 8, 2011).
Final Official Action for U.S. Appl. No. 11/196,826 (dated Aug. 23, 2011).
Official Action for U.S. Appl. No. 11/196,826 (dated Feb. 15, 2011).
Communication pursuant to Article 94(3) EPC for European application No. 06788726.5 (Dec. 1, 2010).
Taiwanese Office Action for Taiwanese Patent Application No. 095128234 (dated Oct. 6, 2010).
Notice of Allowance and Fee(s) Due for U.S. Appl. No. 11/060,249 (dated Sep. 21, 2010).
Official Action for U.S. Appl. No. 11/196,826 (dated Jul. 30, 2010).
Notice of Abandonment for U.S. Appl. No. 11/060,174 (dated Jul. 2, 2010).
Notice of Allowance and Fee(s) Due for U.S. Appl. No. 11/314,842 (dated Apr. 29, 2010).
Taiwanese Office Action for Taiwanese Patent Application No. 095148079 (dated Apr. 23, 2010).
Decision to Grant for Taiwanese Application No. 095128233 (dated Mar. 22, 2010).
Notice of Allowance and Fee(s) Due for U.S. Appl. No. 11/313,633 (dated Mar. 22, 2010).
Final Official Action for U.S. Appl. No. 11/342,170 (dated Mar. 4, 2010).
Commonly-assigned, co-pending U.S. Appl. No. 12/714,237 for "Method and System for Dual Mode Access for Storage Devices," (Unpublished, Feb. 26, 2010).
Interview Summary for U.S. Appl. No. 11/314,842 (dated Feb. 23, 2010).
Notice of Non-Compliant Appeal Brief for U.S. Appl. No. 11/060,249 (dated Feb. 22, 2010).
Notice of Allowance for U.S. Appl. No. 11/313,567 (dated Feb. 12, 2010).
Official Action for Taiwanese Application No. 095148077 (dated Feb. 8, 2010).
Final Official Action far U.S. Appl. No. 11/342,168 (dated Nov. 19, 2009).
Advisory Action for U.S. Appl. No. 11/060,248 (dated Nov. 10, 2009).
Interview Summary for U.S. Appl. No. 11/313,633 (dated Nov. 5, 2009).
Interview Summary for U.S. Appl. No. 11/313,567 (dated Nov. 5, 2009).
Official Action for U.S. Appl. No. 11/314,842 (dated Oct. 26, 2009).
Final Official Action for U.S. Appl. No. 11/196,826 (dated Aug. 18, 2009).
Official Action for Taiwanese Patent Application No. 095128233 (dated Aug. 11, 2009).
China State Intellectual Property Office, "First Office Action," corresponding Chinese Patent Application No. 2006800089822.0, dated Aug. 5, 2009, 7 pages.
China State Intellectual Property Office, "First Office Action," corresponding Chinese Patent Application No. 200680009222.3, dated Jul. 22, 2009, 7 pages.
Official Action for U.S. Appl. No. 11/313,633 (dated Jul. 17, 2009).
Notice of Allowance and Fee(s) Due for U.S. Appl. No. 11/196,168 (dated Jul. 16, 2009).
Official Action for U.S. Appl. No. 11/313,567 (dated Jun. 15, 2009).
Official Action for U.S. Appl. No. 11/342,170 (dated May 20, 2009).
Official Action for U.S. Appl. No. 11/314,842 (dated May 8, 2009).
Interview Summary for U.S. Appl. No. 11/060,249 (dated May 8, 2009).
Final Official Action for U.S. Appl. No. 11/060,248 (dated Apr. 28, 2009).
Final Official Action for U.S. Appl. No. 11/060,174 (dated Apr. 28, 2009).
China State Intellectual Property Office, "Office Action," corresponding Chinese Patent Application No. 200680089894, dated Apr. 24, 2009, 25 pages (including translation).
Final Official Action for U.S. Appl. No. 11/060,249 (dated Apr. 8, 2009).
Communication pursuant to Article 94(3) EPC for European Application No. 06788725.7 (Mar. 10, 2009).
Official Action for U.S. Appl. No. 11/342,168 (dated Mar. 4, 2009).
Official Action for U.S. Appl. No. 11/196,826 (dated Feb. 23, 2009).
Interview Summary for U.S. Appl. No. 11/313,567 (dated Feb. 2, 2009).
Noting of loss of rights pursuant to Rule 112(1) EPC for European Application No. 06734695.7 (Jan. 21, 2009).
Noting of loss of rights pursuant to Rule 112(1) EPC for European Application No. 067720547.6 (Jan. 20, 2009).
Official Action for U.S. Appl. No. 11/313,633 (dated Jan. 6, 2009).
Official Action for U.S. Appl. No. 11/313,567 (dated Jan. 6, 2009).
Official Action for U.S. Appl. No. 11/196,168 (dated Dec. 24, 2008).
Communication pursuant to Article 94(3) EPC for European Application No. 06788726.5 (Dec. 12, 2008).
Official Action for U.S. Appl. No. 11/342,170 (dated Oct. 17, 2008).
Restriction Requirement for U.S. Appl. No. 11/196,826 (dated Oct. 6, 2008).
Official Action for U.S. Appl. No. 11/314,842 (dated Sep. 15, 2008).
Official Action for U.S. Appl. No. 11/342,168 (dated Aug. 19, 2008).
Official Action for U.S. Appl. No. 11/060,248 (dated Aug. 14, 2008).
Official Action for U.S. Appl. No. 11/060,249 (dated Aug. 4, 2008).
Official Action for U.S. Appl. No. 11/060,174 (dated Jul. 24, 2008).
Final Official Action for U.S. Appl. No. 11/196,168 (dated Jul. 24, 2008).
Notification Concerning Transmittal of International Preliminary Report on Patentability for International Application No. PCT/US2006/062341 (dated Jul. 3, 2008).
Notification Concerning the Transmittal of International Preliminary Report on Patentability for International Application No. PCT/US2006/062340 (dated Jul. 3, 2008).
Communication pursuant to Article 94(3) EPC corresponding to European Patent Application No. 06734659.3 (Jun. 23, 2008).
Final Official Action for U.S. Appl. No. 11/313,567 (dated May 28, 2008).
Communication pursuant to Article 94(3) EPC for European Application No. 06734695.7 (May 19, 2008).
Communication pursuant to Article 94(3) EPC for European Application No. 06720547.6 (May 19, 2008).
Final Official Action for U.S. Appl. No. 11/313,633 (dated Apr. 29, 2008).

(56) References Cited

OTHER PUBLICATIONS

Communication of European Publication Number and Information on the Application of Article 67(3) EPC for European Application No. 06788726.5 (Apr. 16, 2008).
Final Official Action for U.S. Appl. No. 11/314,842 (dated Apr. 1, 2008).
Notification Concerning Transmittal of International Preliminary Report on Patentability for International Application No. PCT/US2006/029307 (dated Feb. 14, 2008).
Notification Concerning Transmittal of International Preliminary Report on Patentability for International Application No. PCT/US2006/029306 (dated Feb. 14, 2008).
Interview Summary for U.S. Appl. No. 11/314,842 (dated Jan. 16, 2008).
Interview Summary for U.S. Appl. No. 11/313,567 (dated Jan. 16, 2008).
Final Official Action for U.S. Appl. No. 11/060,249 (dated Dec. 26, 2007).
Official Action for U.S. Appl. No. 11/342,168 (dated Dec. 26, 2007).
Final Official Action for U.S. Appl. No. 11/060,248 (dated Dec. 26, 2007).
Official Action for U.S. Appl. No. 11/342,170 (dated Dec. 14, 2007).
Final Official Action for U.S. Appl. No. 11/060,174 (dated Dec. 12, 2007).
Official Action for U.S. Appl. No. 11/196,168 (dated Nov. 28, 2007).
Notification of Transmittal of the International Search Report and the Written Opinion of the International Searching Authority, or the Declaration for International Application No. PCT/US2006/062340 (dated Oct. 29, 2007).
Official Action for U.S. Appl. No. 11/313,567 (dated Oct. 9, 2007).
Official Action for U.S. Appl. No. 11/313,633 (dated Oct. 9, 2007).
Official Action for U.S. Appl. No. 11/314,842 (dated Oct. 9, 2007).
International Preliminary Report on Patentability for International Application No. PCT/US2006/004658 (dated Aug. 21, 2007).
International Preliminary Report on Patentability for International Application No. PCT/US2006/004585 (dated Aug. 21, 2007).
International Preliminary Report on Patentability for International Application No. PCT/US2006/004555 (dated Aug. 21, 2007).
Notification of Transmittal of the International Search Report and the Written Opinion of the International Searching Authority, or the Declaration for International Application No. PCT/US2006/062341 (dated Jun. 26, 2007).
Official Action for U.S. Appl. No. 11/060,249 (dated Apr. 13, 2007).
Official Action for U.S. Appl. No. 11/060,248 (dated Apr. 5, 2007).
Official Action for U.S. Appl. No. 11/060,174 (dated Mar. 27, 2007).
Notification of Transmittal of the International Search Report and the Written Opinion of the International Searching Authority, or the Declaration for International Application No. PCT/US2006/029307 (dated Mar. 9, 2007).
Notification of Transmittal of the International Search Report and the Written Opinion of the International Searching Authority, or the Declaration for International Application No. PCT/US2006/029306 (dated Mar. 9, 2007).
Notification of Transmittal of the International Search Report and the Written Opinion of the International Searching Authority, or the Declaration for International Application No. PCT/US2006/004555 (dated Oct. 4, 2006).
International Search Report for International Application No. PCT/US2006/004658 (dated Aug. 23, 2006).
Notification of Transmittal of the International Search Report and the Written Opinion of the International Searching Authority, or the Declaration for International Application No. PCT/US2006/004585 (dated Aug. 17, 2006).
Written Opinion of the International Searching Authority for International Application No. PCT/US2005/000275 (dated Aug. 7, 2006).
Lim et al., "An Efficient NAND Flash File System for Flash Memory Storage," IEEE Transactions on Computer, vol. 55, No. 7, pp. 906-912 (Jul. 1, 2006).
Notice of Allowance and Fee(s) due for U.S. Appl. No. 10/772,855 (dated Jun. 16, 2006).
Notice of Allowance and Fee(s) due for U.S. Appl. No. 10/772,789 (dated Jun. 16, 2006).
Official Action for U.S. Appl. No. 10/772,789 (dated Mar. 24, 2006).
Notice of Allowance and Fee(s) due for U.S. Appl. No. 10/772,855 (dated Feb. 21, 2006).
Co-pending U.S. Patent Application entitled "Method and System for Accessing Non-Volatile Storage Devices," U.S. Appl. No. 11/313,633, filed Dec. 22, 2005.
Co-pending U.S. Patent Application entitled "Dual Mode Access For Non-Volatile Storage Devices," U.S. Appl. No. 11/314,842, filed Dec. 21, 2005.
Co-pending U.S. Patent Application entitled "Method and System for Accessing Non-Volatile Storage Devices," U.S. Appl. No. 11/313,567, filed Dec. 21, 2005.
Gal et al. "Algorithms and Data Structures for Flash Memories," ACM Computing Surveys (CSUR) vol. 37, Issue 2, pp. 138-163, (Jun. 2005).
Co-pending U.S. Patent Application entitled Direct File Data Programming and Deletion in Flash Memories,) U.S. Appl. No. 11/060,174, filed Feb. 16, 2005.
Co-pending U.S. Provisional Patent Application entitled "Direct Data File Storage in Flash Memories", U.S. Appl. No. 60/705,388, filed Aug. 3, 2004.
Rankl, Wolfgang, "Smart Card Handbook," Third Edition, Translated by Kenneth Cox, John Wiley & Sons, Ltd., pp. 52-93, 233-369, & 435-490, (2004).
Imamiya et al., "A 125-mm2 1-Gb NAND Flash Memory with 10-Mbyte/s Program Speed," IEEE Journal of Solid-State Circuits, vol. 37, No. 11, pp. 1493-1501, (Nov. 2002).
Kim et al., "A Space-Efficient Flash Translation Layer for CompactFlash Systems," IEEE Transactions on Consumer Electronics, vol. 48, No. 2, pp. 366-375, (May 2002).
LAI/The Waite Group, "Writing MS-DOS® Device Drivers," Second Edition, pp. 240-253 (2002).
Microsoft Computer Dictionary, Microsoft Press, 2002, Fifth Edition, p. 151.
Ban, Amir, "Local Flash Disks: Two Architectures Compared," M-Systems Flash Disks Pioneers, White Paper, Rev. 1.0, pp. 1-8 (Aug. 2001).
DataChute PCI Release Note, Feb. 13, 2001, pp. 1-12.
Kim, et al., "A New Flash Memory Management for Flash Storage System," Computer Software and Applications Conference, 1999. Compasac '99 Proceedings. IEEE Comput. Soc., pp. 284-289 (1999).
Chiang et al., "Cleaning Policies in Mobile Computers Using Flash Memory," Journal of Systems & Software, vol. 48, pp. 213-231 (199).
"Intel AP-686 Application Note, Flash File System Selection Guide," 18 pgs. (Dec. 1998).
"ISO/IEC, International Standard, Information Technology—Identification Cards—Integrated Circuit(s) With Contracts," Part 4: Interindustry Commands for Interchange, ISO/IEC 7816-4, First Edition, 46 pgs. (Sep. 1, 1995).
Eshel et al.,"Multiple Caching Schemes in a Lan-Attached Server," IP.Com Journal, IP.Com Inc., West Henrietta, NY, US. (Apr. 1, 1995).
Kjelso et al., "Memory Management in Flash-Memory Disks with Data Compression," Springer-Verlag, pp. 399-413 (1995).
Wu et al., "Envy: A Non-Volatile, Main Memory Storage System," ACM Sigplan Notices, vol. 29, No. 11, pp. 86-97, (Nov. 1, 1994).
Hitz, D. et al., "File System Design for an NFS File Server Appliance," Network Appliance Technical Report 3002 Retrieved from http://citeseer.ist.psu.edu/hitz95file.html (Jan. 19, 1994).
Ban, Amir, "Inside Flash File Systems—Part II," IC Card Systems & Design, pp. 21-24, (Sep./Oct. 1993).
Ban, Amir, "Inside Flash File Systems—Part I," IC Card Systems & Design, pp. 15-16, & 18, (Jul. Aug. 1993).
Kolowsky, "Introduction to MTP: Media Transfer Protocol," Cypress Semiconductor (Publication Date Unknown).

(56) References Cited

OTHER PUBLICATIONS

Chiang et al., "Data Management in a Flash Memory Based Storage Server," National Chiao-Tung University, Hsinchu, Taiwan, Dept. Of Computer and Information Science, 8 pages, (Publication Date Unknown).

PNY Technologies Attache Flash Product, http://www.pny.com/products/flash/attache.asp (Copyright 2003).

Decision to grant a European patent pursuant to Article 97(1) EPC for European Patent Application No. 06788726.5 (Mar. 24, 2016).

Communication under Rule 71(3) EPC for European Patent Applicaiton No. 06 788 726.5 (Nov. 5, 2015).

Commonly-assigned, co-pending U.S. Appl. No. 14/815,891 for "Systems and Methods for a Mass Data Storage System Having a File-Based Interface to a Host and a Non-File-Based Interface to Secondary Storage," (Unpublished, filed Jul. 31, 2015).

Sinclair, et al., Office Action dated Aug. 23, 2017 for U.S. Appl. No. 14/815,891.

\* cited by examiner

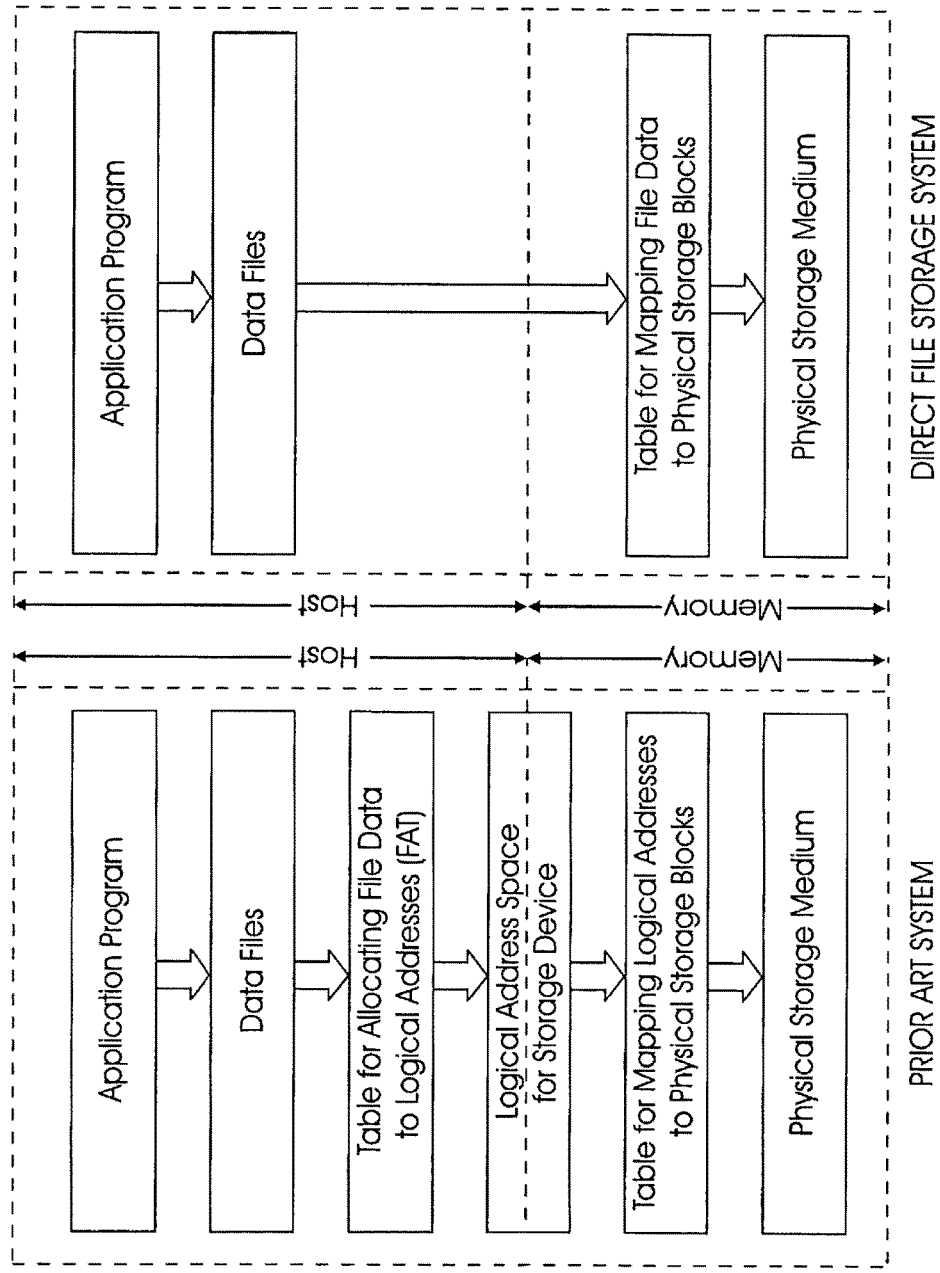

Table I

| Source | Destination | Operation Type | Description | |
|---|---|---|---|---|
| Host | Primary store | File Write | Preferred transfer for a file write operation. | 201 |
| Host | Secondary Store | File Write | Not a preferred operation. Only occurs when insufficient space for writing file is available in primary store. | 202 |
| Primary store | Host | File Read | Transfer for a file read operation, when current version of file resides in primary store. | 203 |
| Secondary Store | Host | File Read | Transfer for a file read operation, when current version of file resides in secondary store. | 204 |
| Primary store | Secondary Store | File Copy | File copy directly from primary store to secondary store. May occur when host interface is inactive. | 205 |
| Secondary Store | Primary store | File Copy | File copy directly from secondary store to primary store. May occur when host interface is inactive. | 206 |
| Primary store | Buffer | File Copy | File copy from primary store to buffer. | 207 |
| Buffer | Primary store | File Copy | File copy from buffer to primary store. May occur concurrently with transfer from secondary store to host. | 208 |
| Secondary Store | Buffer | File Copy | File copy from secondary store to buffer. May occur concurrently with transfer in either direction between host and primary store. | 209 |
| Buffer | Secondary Store | File Copy | File copy from buffer to secondary store. May occur concurrently with transfer in either direction between host and primary store. | 210 |

FIGURE 2P

| File Identifier | Segment 1 Location | Segment 2 Location |
|---|---|---|
| <F> | Primary Store | Secondary Store |
| | | |

| File Identifier | File offset address range for data in primary store 106C | | File offset address range for data in secondary store 106D | |
| --- | --- | --- | --- | --- |
| | Start | End | Start | End |
| <Filename> | n1 | n2 | n3 | n4 |
| | | | | |

File Locator Table 106A

Figure 2T

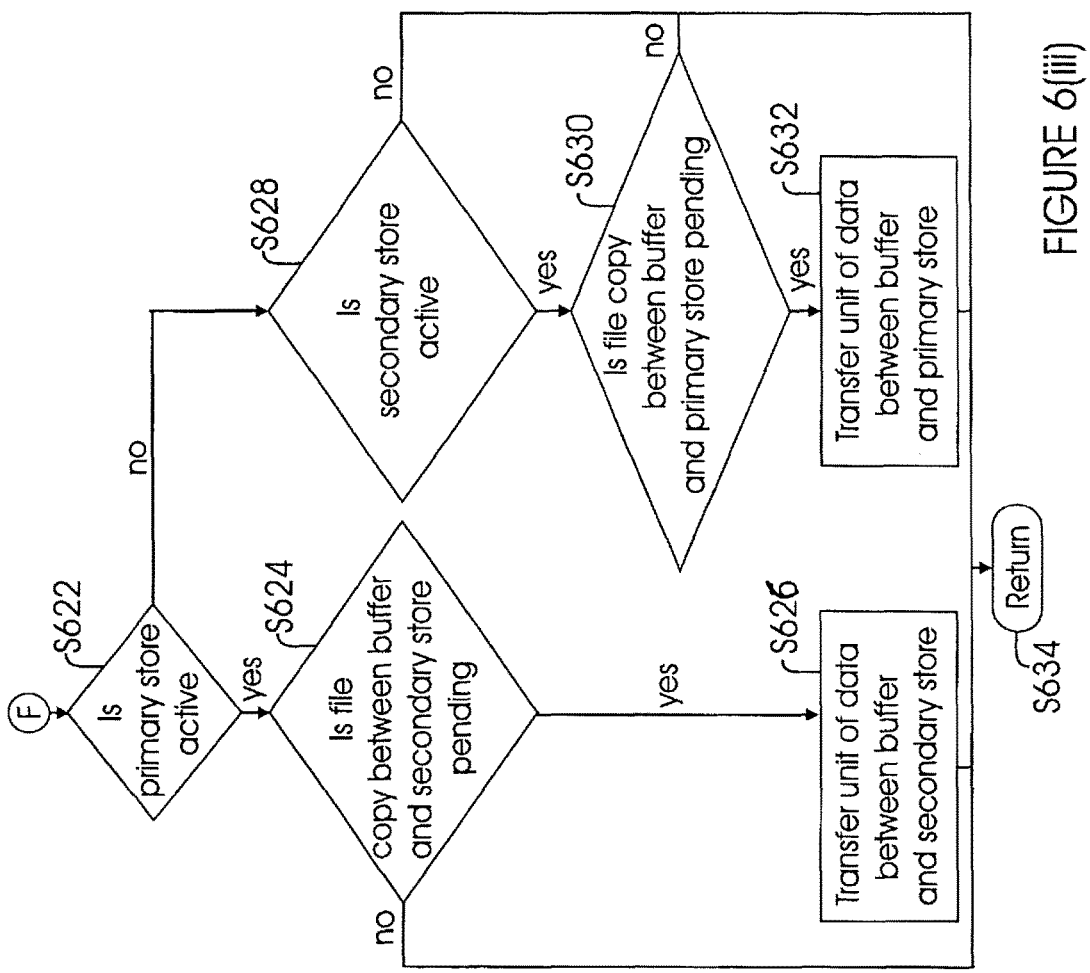
FIGURE 6(iii)

Copy Log

| File No | File Identifier | File Location | Destination |
|---|---|---|---|
| 1 | | | |
| 2 | | | |
| 3 | | | |
| • | | | |
| • | | | |
| • | | | |
| 1 | | | |
| N | | | |

700

SYSTEMS AND METHODS FOR A MASS DATA STORAGE SYSTEM HAVING A FILE-BASED INTERFACE TO A HOST AND A NON-FILE-BASED INTERFACE TO SECONDARY STORAGE

PRIORITY

This application is a divisional of U.S. patent application Ser. No. 11/196,826, filed Aug. 3, 2005, the disclosure of which is hereby incorporated by reference in its entirety.

CROSS REFERENCE TO RELATED APPLICATIONS

This application is related to the following co-pending patent applications, incorporated herein by reference in their entirety:

Ser. No. 10/772,855; Filed on Feb. 4, 2005; entitled "Dual Media Storage Device" with Alan W. Sinclair as the inventor;

Ser. No. 10/772,789; Filed on Feb. 4, 2005; entitled "Mass Storage Accelerator" with Alan W. Sinclair as the inventor; and Ser. No. 11/060,249; Filed on Feb. 16, 2005; entitled "Direct Data File Storage in Flash Memories" with Alan W. Sinclair and Peter J. Smith as inventors;

Ser. No. 11/060,174; Filed on Feb. 16, 2005; entitled "Direct Data File Programming and Deletion in Flash Memories", with Alan W. Sinclair and Peter J. Smith as inventors;

Ser. No. 11/060,248; Filed on Feb. 16, 2005; entitled "Direct Data File Storage Implementation Techniques in Flash Memories", with Alan W. Sinclair and Peter J. Smith as inventors; and Provisional patent application filed by Alan W. Sinclair and Barry Wright concurrently herewith, and entitled "Direct Data File Storage in Flash Memories" (the foregoing hereinafter collectively referenced as the "Direct Data File Storage Applications").

BACKGROUND OF THE INVENTION

1. Field of the Invention

The present invention relates generally to storage devices, and more particularly, to a dual media storage device using a direct data file storage interface.

2. Background

Conventional computer systems typically include several functional components. These components may include a central processing unit (CPU), main memory, input/output ("I/O") devices, and mass storage. In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Mass storage is typically used to retain data. Generally, a program stored in mass storage is copied to main memory before being executed by the CPU. Common mass storage devices include floppy disks, hard disks, optical disks and tape drives.

Additionally, flash memory may be used to provide non-volatile storage. A host system interfaces with flash memory (also referred to as "flash device", "flash" or "flash card" interchangeably throughout this specification) via an interface. Flash memory typically includes non-volatile memory cell arrays for storing information.

Flash memory systems are most commonly provided in the form of a memory card or flash drive that is removably connected with a variety of hosts such as a personal computer, a camera or the like, but may also be embedded within such host systems.

A flash memory controller typically controls the operations of a memory array. The memory controller includes a microprocessor, some non-volatile read only memory ("ROM"), a volatile random-access memory ("RAM") and one or more special circuits, for example, an error correction-code circuit ("ECC") that calculates ECC from data as it passes through the memory controller.

In an early generation of commercial flash memory systems, a rectangular array of memory cells were divided into a large number of groups of cells that each stored the amount of data of a standard disk drive sector, namely 512 bytes. An additional amount of data, such as 16 bytes, are also usually included in each group to store an error correction code (ECC) and possibly other overhead data relating to the user data and/or to the memory cell group in which it is stored. The memory cells in each such group are the minimum number of memory cells that are erasable together. That is, the erase unit is effectively the number of memory cells that store one data sector and any overhead data that is included. Examples of this type of memory system are described in U.S. Pat. Nos. 5,602,987 and 6,426,893. It is a characteristic of flash memory that the memory cells need to be erased prior to re-programming them with data.

In conventional systems, a host maintains a file system and allocates file data to logical clusters, where the cluster size is typically fixed. A flash device is divided into plural logical sectors and the host allocates space within the clusters comprising of a plurality of logical sectors. A cluster is a sub-division of logical addresses and a cluster map is designated as a file allocation table ("FAT"). The FAT is normally stored on the storage device itself.

In conventional systems, when writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A controller within the memory system translates logical addresses received from the host into physical addresses within the memory array, where the data are actually stored, and then keeps track of these address translations. The data storage capacity of the memory system is at least as large as the amount of data that is addressable over the entire logical address space defined for the memory system.

The inventor has previously explored the concept of merging separate devices (i.e. mass storage and flash memory) into a single mass storage system, as disclosed in the aforementioned co-pending patent applications. These integrated devices operate where a logical interface is used to transfer data between the host and the merged storage systems.

Other file storage systems (or formats) are now being developed so that a host does not have to perform file to logical address mapping.

Therefore, there is a need for a method and system that allows a host system to efficiently read/write data to/from a flash memory system that uses a non-traditional file storage format and a mass storage device that is still based on conventional logical address space/format using a logical interface.

SUMMARY OF THE INVENTION

In one aspect of the present invention, a system for transferring data between a host system and a data storage system is provided. The system includes an interface that uses a file based protocol to transfer data between the data storage system and the host system, wherein the data storage system includes a first mass storage device and a second mass storage device; wherein the first mass storage device is a solid state non-volatile memory device and the second mass storage device is a non-solid state memory device.

The first mass storage device is a flash memory device that operates as a primary storage device that stores data on a file by file basis. The second mass storage device is a magnetic disk drive that operates as secondary storage device and stores data received via a logical interface.

In another aspect of the present invention, a system for transferring data between a host system and a data storage system is provided. The system includes an interface that uses a file based protocol to transfer data between the data storage system and the host system, wherein the data storage system includes a first non-volatile mass storage device and a second non-volatile mass storage device; and the first non-volatile mass storage device stores data in a first format and the second non-volatile mass storage device stores data in a second format.

In yet another aspect of the present invention, a data storage system is provided. The data storage system includes a first non-volatile mass storage device that interfaces with a host system via an interface that uses a file based protocol; and a second non-volatile mass storage device; wherein the second non-volatile mass storage device interfaces with the first non-volatile mass storage device and data from the host system can be stored in the first non-volatile mass storage device and/or the second non-volatile mass storage device.

In another aspect of the present invention, a data storage system is provided. The data storage system includes a first non-volatile mass storage device that interfaces with a host system via a file based protocol; wherein the first non-volatile mass storage device includes a disk driver to interface with a second non-volatile mass storage device and file data from the host system can be stored in the first non-volatile mass storage device and/or second non-volatile mass storage device.

In yet another aspect of the present invention, a method for writing data sent by a host system to a mass storage system is provided. The mass storage system includes a first non-volatile mass storage device and a second non-volatile mass storage device. The method includes identifying individual files of data by unique file identifiers and offsets within the individual files, wherein the host system generates the unique file identifiers and the offsets, and sends the file identifiers and offsets to the mass storage system; and storing the data in the first non-volatile mass storage device, if space is available in the first non-volatile storage device; and if storage space for the file is unavailable in the first non-volatile mass storage device, then scheduling a copy operation for transferring data from the first non-volatile mass storage device to the second non-volatile mass storage device.

In another aspect of the invention, a method for reading data from a mass storage system is provided. The mass storage system includes a first non-volatile mass storage device and a second non-volatile mass storage device. The method includes, receiving individual unique file identifiers and offsets for a file, wherein a host system generates the unique file identifiers and offsets, and sends the file identifiers and offsets to the mass storage system for data to be read from the mass storage system; determining if the file is located in the first non-volatile mass storage device or the second non-volatile mass storage device; and accessing data from the first non-volatile mass storage device, if the file is located in the first non-volatile mass storage device.

In yet another aspect of the present invention, a method is provided for writing data sent by a host system to a mass storage system with a first non-volatile mass storage device and a second non-volatile mass storage device. The method includes identifying individual files of data by unique file identifiers and offsets within the individual files, wherein the host system generates the unique file identifiers and the offsets, and sends the file identifiers and offsets to the mass storage system; writing the file data to the first non-volatile mass storage device, if space is available in the first non-volatile mass storage device; determining if the file data should be segmented; and copying a file segment to the second non-volatile mass storage device.

In yet another aspect of the present invention, a method is provided for writing data sent by a host system to a mass storage system, wherein the mass storage system includes a first non-volatile mass storage device and a second non-volatile mass storage device. The method includes receiving a write command from a host system; sending a write command to the first non-volatile mass storage device for writing a first file segment, if space is available in the first non-volatile mass storage device; sending a write command to the second non-volatile mass storage device for writing a second file segment; storing the first file segment in the first non-volatile mass storage device while the second non-volatile mass storage device is getting ready to store the second file segment; and storing a second file segment in the second non-volatile mass storage device.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 2H shows in a different manner than FIG. 2F a conventional logical address interface between a host and a re-programmable memory system;

FIG. 2L shows in a different manner than FIG. 2G, a direct data file storage interface between a host and a re-programmable memory system, according to one aspect of the present invention;

FIG. 2P shows a table with a listing of various operations that are performed using the virtual store of FIG. 2N, according to one aspect of the present invention;

FIG. 2T shows a block diagram of a file locator table, according to one aspect of the present invention;

DETAILED DESCRIPTION OF THE PREFERRED EMBODIMENTS

To facilitate an understanding of the preferred embodiment, the general architecture and operation of a host system/flash device will be described. The specific architecture and operation of the preferred embodiment will then be described with reference to the general architecture.

Figure 1A:
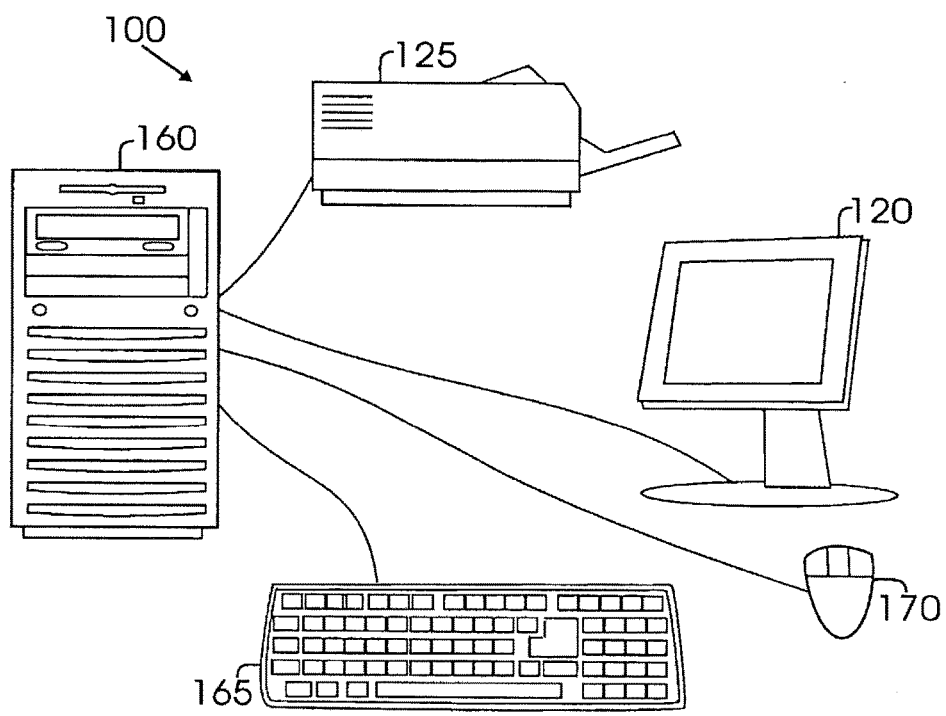
FIG. 1A shows a block diagram of a host system using a flash device.

Host System:

FIG. 1A shows a general-purpose computer system (host system) 100 that can utilize the present invention. Components of system 100 include a computer 160, various input/output ("I/O") devices such as a mouse 170, keyboard 165, monitor 120 and printer 125.

Figure 1B:
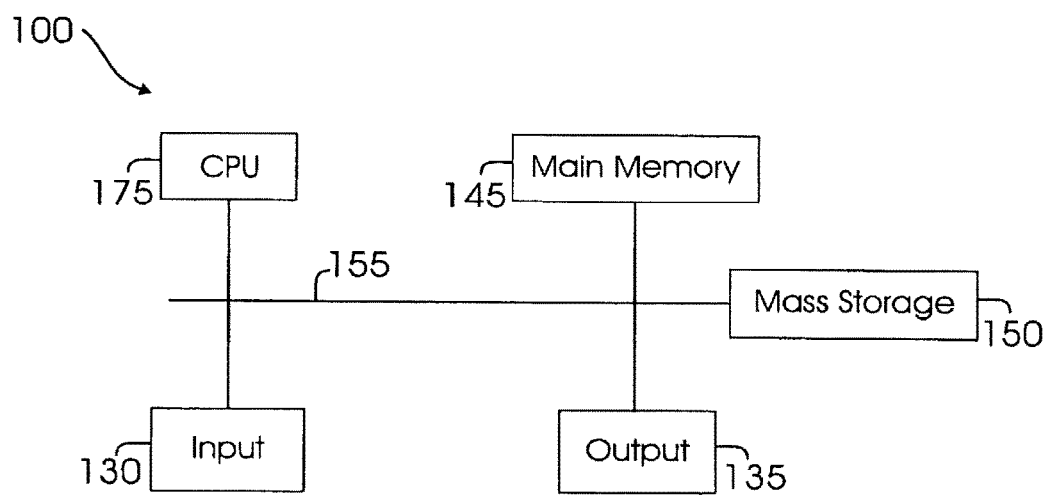
FIG. 1B shows the architecture of the host system of FIG. 1A.

FIG. 1B shows an abstracted representation of computer system 100. Component 130 is intended to represent plural input devices, such as a mouse and keyboard that allow a user to interact with the computer system 100. Similarly, output 135 represents one or more output devices, for example, monitor 120 and printer 125.

Computer system 100 includes a central processing unit ("CPU") (or microprocessor) 175 connected to a system bus 155. Main memory 145 (for example, Random access main memory ("RAM")) is also coupled to system bus 155 and provides CPU 175 with access to memory storage. When executing program instructions, CPU 175 stores those process steps in RAM 145 and executes the stored process steps out of RAM 145.

Read only memory ("ROM") (not shown) is provided to store invariant instruction sequences such as start-up instruction sequences or basic Input/output operating system (BIOS) sequences.

Mass storage device 150 allows computer system 100 to permanently retain large amounts of data. Mass storage device 150 is described below in detail.

Figure 2A:
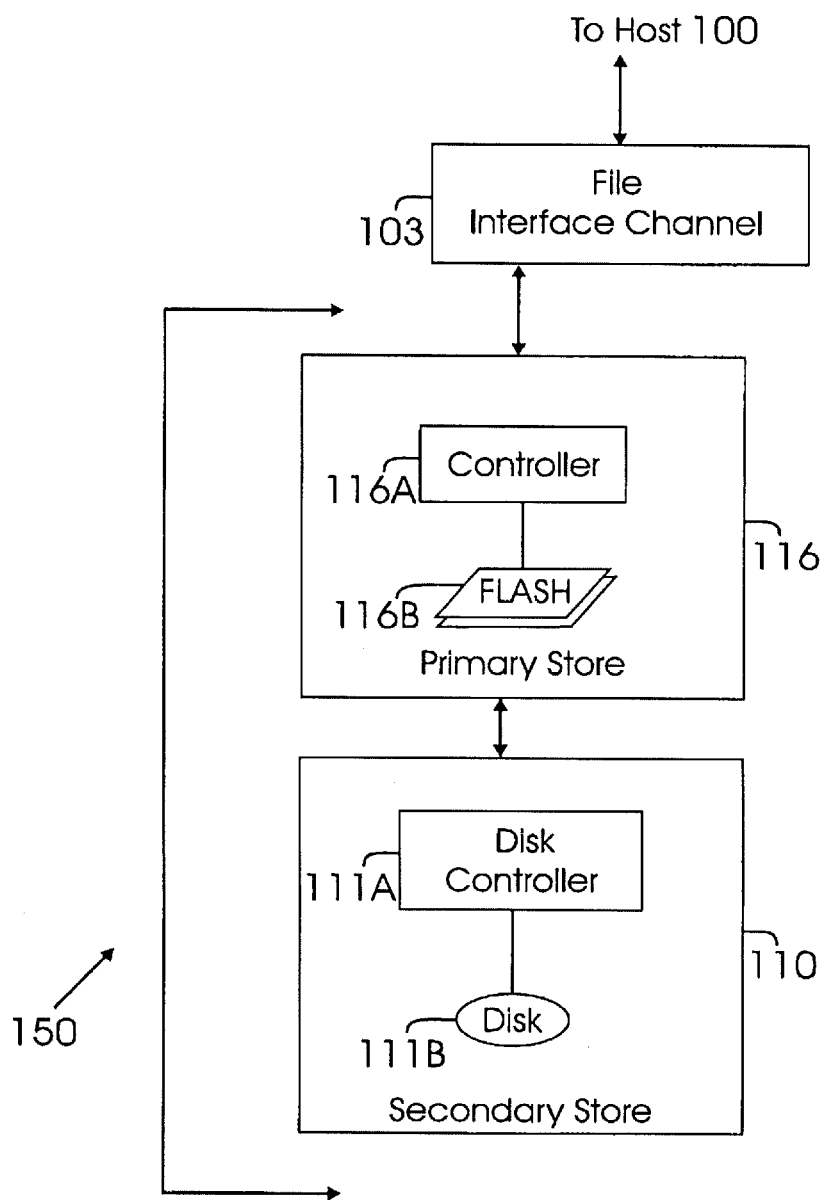
FIG. 2A shows a block diagram of a virtual store, according to one aspect of the present invention.

Mass Storage System:

FIG. 2A shows a block diagram of mass storage system (may also referred to as virtual flash store or virtual storage device) 150. Mass storage system 150 interfaces with host system 100 via a file interface channel 103. File interface 103 facilitates data/command transfer between mass storage 150 components and host system 100 using a file based protocol, described below.

Mass storage 150 is a virtual flash file store that uses a direct data file flash device (or solid state non-volatile memory device) 116 (also shown as 116 in FIG. 2N) as a primary store (also referred to as primary storage device) and a high capacity magnetic disk (or any other non-solid state memory device, for example, a tape drive) 110 as a secondary store (also referred to as secondary storage device). Data is stored in flash device 116 on a file-by-file basis.

Secondary store 110 includes disk controller 111A and memory storage 111B. Disk controller 111A facilitates data transfer between the primary store 116 and the secondary store 110. It is noteworthy that secondary store 110 may be a non-solid state memory device, for example, a hard disk, tape drive and others.

To a user mass storage device 150 appears to be a flash storage device, when in reality a magnetic disk 110 is used in conjunction with flash device 116.

It is noteworthy that primary store 116 may be an integral part of host system 100, while secondary store 110 operating as a traditional hard disk may be external to host system 100. Furthermore, the primary store 116 and the secondary store 110 may store data using similar or different formats.

Flash device 116 (or Primary store 116, used interchangeably throughout this specification) includes a controller module 116A (may also be referred to as "memory system controller" or" "memory controller" or "controller") and solid-state memory modules 116B. Controller 116A interfaces with host system 100 via file interface 103 or another peripheral bus (not shown) or via system bus 155.

There are currently many different flash devices (or flash memory cards) that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications, the flash memory included in each is very similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USE receptacle. Each of these memory cards and flash drives includes controllers that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged.

Primary store 116 when compared to secondary store 110 is compact and has higher resistance to shock and vibration because it can operate without moving parts, unlike secondary store 110 that uses various moving parts.

Primary store 116 also has faster seek time than secondary store 110, i.e., a host can read and write data to/from primary store 116 faster than it can from/to the secondary store 110. Primary store 116 typically has less storage capacity than secondary store 110. Mass storage system 150 advantageously provides both a faster direct data file flash storage device and a high capacity storage device, described below in detail.

A NAND architecture of the memory cell arrays 116B is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 2B:
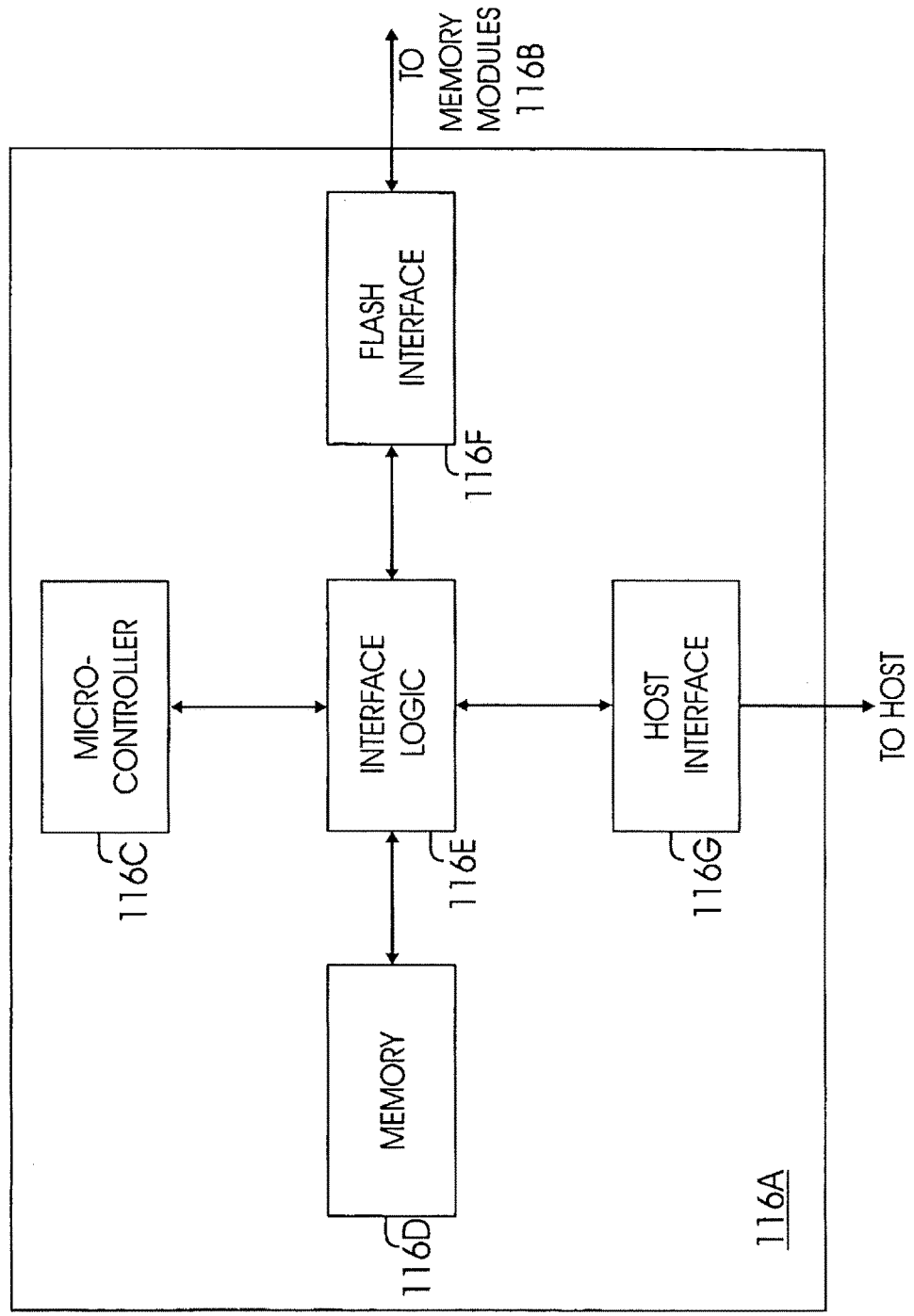
FIG. 2B shows a block diagram of a memory controller of a flash device, used according to one aspect of the present invention.

FIG. 2B shows a block diagram of the internal architecture of controller module 116A. Controller module 116A includes a microcontroller 116C that interfaces with various other components via interface logic 116E. Memory 116D stores firmware and software instructions that are used by microcontroller 116C to control the operation of flash device 116. Memory 116D may be volatile re-programmable random access memory ("RAM"), a non-volatile memory that is not re-programmable ("ROM"), a one-time programmable memory or a re-programmable flash electrically-erasable and programmable read-only memory ("EEPROM").

A host interface 116G interfaces with host system 100 (via file interface 103), while a flash interface 116F interfaces with memory modules 116B.

Figure 2C:
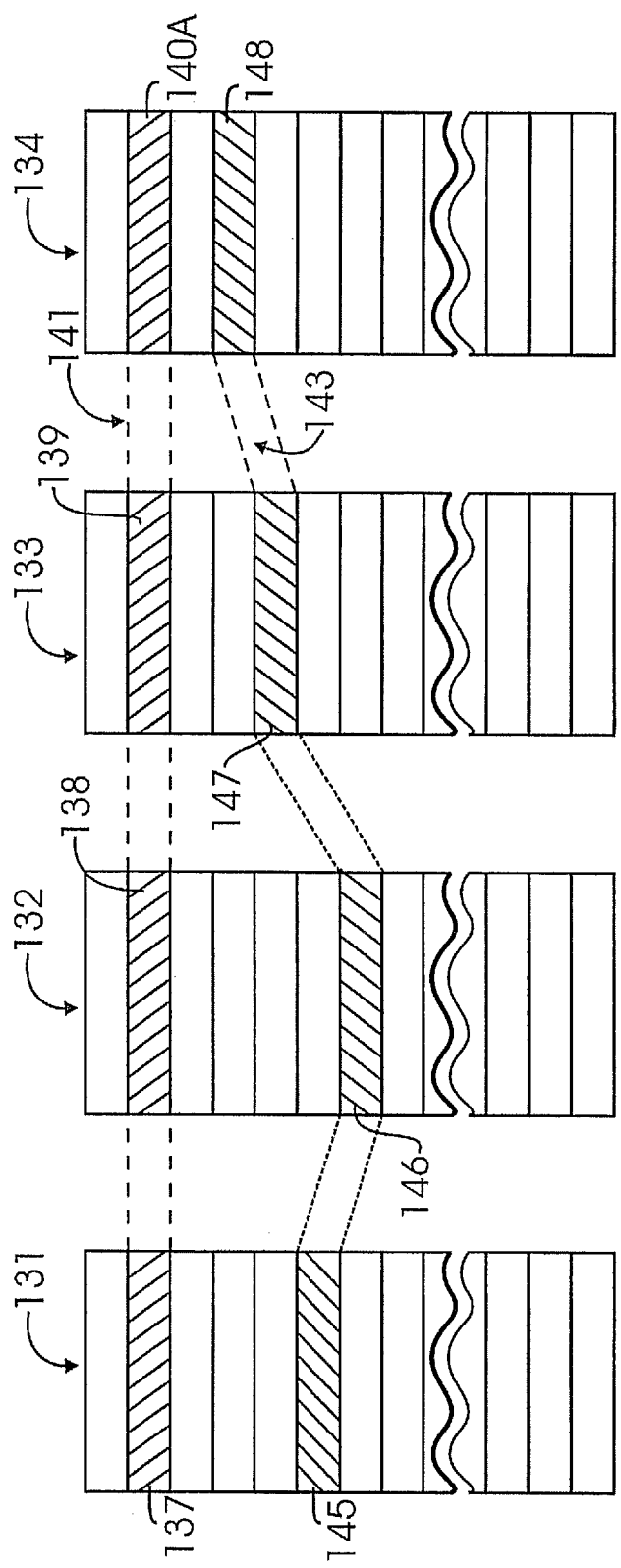
FIG. 2C shows an example of physical memory organization for a flash memory system.

FIG. 2C conceptually illustrates an organization of the flash memory cell array (116B) that is used as an example in further descriptions below. Four planes or sub-arrays 131-134 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 2C by rectangles, such as blocks 137, 138, 139 and 140A, located in respective planes 131-134. There can be dozens or hundreds of blocks in each plane.

A block of memory cells is the unit of erase, the smallest number of memory cells that are physically erasable together. For increased parallelism, however, the blocks are operated in larger metablock units. One block from each plane is logically linked together to form a metablock. The four blocks 137-140A are shown to form one metablock 141. All of the cells within a metablock are typically erased together. The blocks used to form a metablock need not be restricted to the same relative locations within their respective planes, as is shown in a second metablock 143 made up of blocks 145-148.

Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 2D:
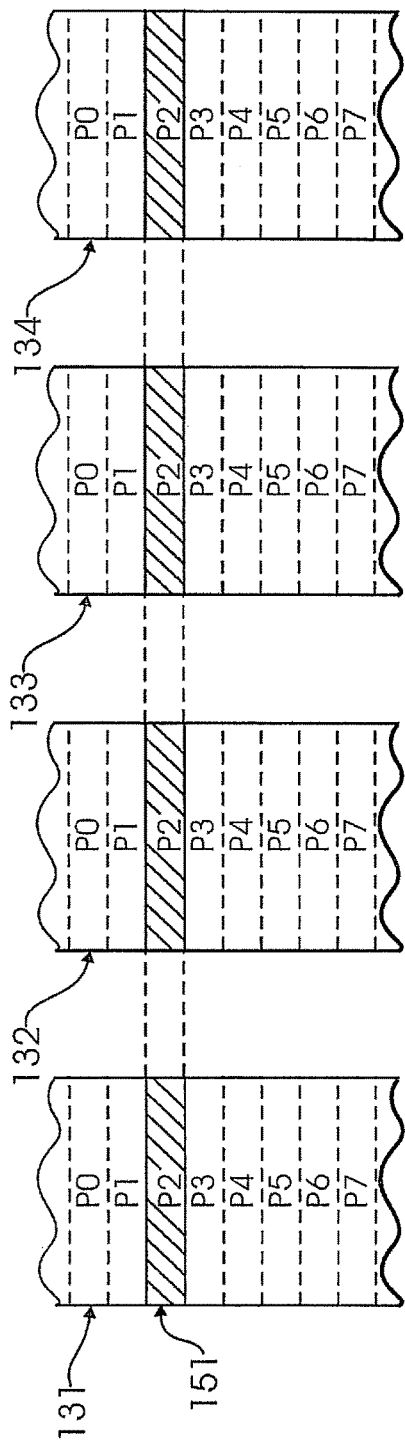
FIG. 2D shows an expanded view of a portion of the physical memory of FIG. 2C.

The individual blocks are in turn divided for operational purposes into pages of memory cells, as illustrated in FIG. 2D. The memory cells of each of the blocks 131-134, for example, are each divided into eight pages P0-P7. Alternatively, there may be 16, 32 or more pages of memory cells within each block. The page is the unit of data programming and reading within a block, containing the minimum amount of data that are programmed at one time.

In the NAND architecture, a page is formed of memory cells along a word line within a block. However, in order to increase the memory system operational parallelism, such pages within two or more blocks may be logically linked into metapages. A metapage 151 is illustrated in FIG. 2D, being formed of one physical page from each of the four blocks 131-134. The metapage 151, for example, includes the page P2 in of each of the four blocks but the pages of a metapage need not necessarily have the same relative position within each of the blocks.

Although it is preferable to program and read the maximum amount of data in parallel across all four planes, for high system performance, the memory system can also be operated to form metapages of any or all of one, two or three pages in separate blocks in different planes. This allows the programming and reading operations to adaptively match the amount of data that may be conveniently handled in parallel and reduces the occasions when part of a metapage remains un-programmed with data.

A metapage formed of physical pages of multiple planes, as illustrated in FIG. 2D, contains memory cells along word line rows of those multiple planes. Rather than programming all of the cells in one word line row at the same time, they are more commonly alternately programmed in two or more interleaved groups, each group storing a page of data (in a single block) or a metapage of data (across multiple blocks). By programming alternate memory cells at one time, a unit of peripheral circuits including data registers and a sense amplifier need not be provided for each bit line but rather are time-shared between adjacent bit lines. This economizes on the amount of substrate space required for the peripheral circuits and allows the memory cells to be packed with an increased density along the rows. Otherwise, it is preferable to simultaneously program every cell along a row in order to maximize the parallelism available from a given memory system.

Figure 2E:
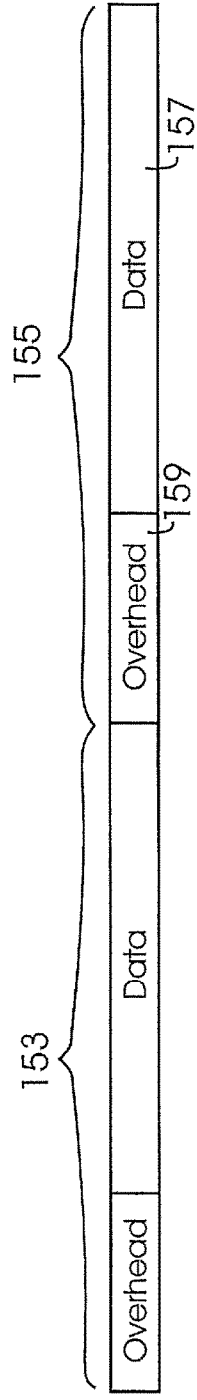
FIG. 2E shows a further expanded view of a portion of the physical memory of FIGS. 2C and 2D.

FIG. 2E shows a logical data page of two sectors 153 and 155 of data of a page or metapage. Each sector usually contains a portion 157 of 512 bytes of user or system data being stored and another number of bytes 159 for overhead data related either to the data in the portion 157 or to the physical page or block in which it is stored. The number of bytes of overhead data is typically 16 bytes, making the total 528 bytes for each of the sectors 153 and 155. The overhead portion 159 may contain an ECC calculated from the data portion 157 during programming, its logical address, an experience count of the number of times the block has been erased and re-programmed, one or more control flags, operating voltage levels, and/or the like, plus an ECC calculated from such overhead data 159. Alternatively, the overhead data 159, or a portion of it, may be stored in different pages in other blocks.

As the parallelism of memories increases, data storage capacity of the metablock increases and the size of the data page and metapage also increase as a result. The data page may then contain more than two sectors of data. With two sectors in a data page, and two data pages per metapage, there are four sectors in a metapage. Each metapage thus stores 2048 bytes of data. This is a high degree of parallelism, and can be increased even further as the number of memory cells in the rows is increased. For this reason, the width of flash memories is being extended in order to increase the amount of data in a page and a metapage.

The physically small re-programmable non-volatile memory cards and flash drives identified above are commercially available with data storage capacity of 512 megabytes (MB), 1 gigabyte (GB), 2 GB and 4 GB, and may go higher.

Figure 2F:
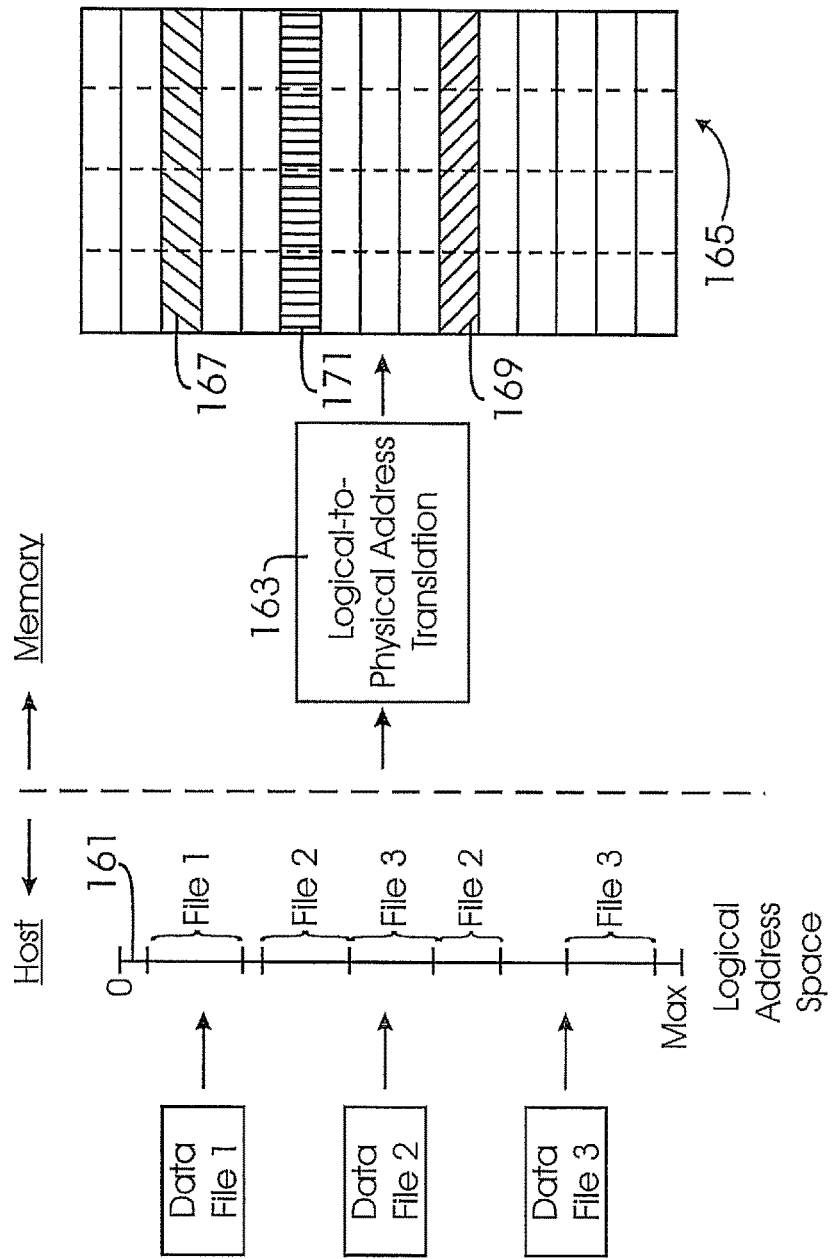
FIG. 2F shows a conventional logical address interface between a host and a re-programmable memory system.

FIG. 2F illustrates the most common interface between a host and a mass memory system. The host deals with data files generated or used by application software or firmware programs executed by the host. A word processing data file is an example, and a drawing file of computer aided design (CAD) software is another, found mainly in general computer hosts such as PCs, laptop computers and the like. A document in the pdf format is also such a file. A digital camera generates a data file (still and/or video) for each picture that is stored on a memory card. A cellular telephone utilizes data from files on an internal memory card, such as a telephone directory. A PDA stores and uses several different files, such as an address file, a calendar file, and the like. In any such application, the memory card may also contain software that operates the host.

A common logical interface between the host and the memory system is illustrated in FIG. 2F. A continuous logical address space 161 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of data.

Three Files 1, 2 and 3 are shown in the example of FIG. 2F to have been created. An application program running on the host system creates each file as an ordered set of data and identifies it by a unique name or other reference. Enough available logical address space not already allocated to other files is assigned by the host to File 1. File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a File 2 is later created by the host, the host similarly assigns two different ranges of contiguous addresses within the logical address space 161, as shown in FIG. 2F. A file need not be assigned contiguous logical addresses but rather can be fragments of addresses in between address ranges already allocated to other files. This example then shows that yet another File 3 created by the host is allocated other portions of the host address space not previously allocated to the Files 1 and 2 and other data.

The host keeps track of the memory logical address space by maintaining a file allocation table (FAT), where the logical addresses the host assigns to the various host files are maintained. The FAT table is typically stored in the non-volatile memory, as well as in a host memory, and is frequently updated by the host as new files are stored, other files deleted, files modified and the like. When a host file is deleted, for example, the host then de-allocates the logical addresses previously allocated to the deleted file by updating the FAT table to show that they are now available for use with other data files.

The host is not concerned about the physical locations where the memory system controller chooses to store the files. The typical host only knows its logical address space and the logical addresses that it has allocated to its various files. The memory system, on the other hand, through a typical host/card interface, only knows the portions of the logical address space to which data have been written but does not know the logical addresses allocated to specific host files, or even the number of host files. The memory system controller 116A converts the logical addresses provided by the host for the storage or retrieval of data into unique physical addresses within the flash memory cell array where host data are stored. A block 163 represents a working table of these logical-to-physical address conversions, which is maintained by the memory system controller 116A.

The memory system controller 116A is programmed to store data files within the blocks and metablocks of a memory array 165 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 167 is usually allocated as a reserved block for storing operating firmware and data used by the memory controller. Another metablock 169, or multiple metablocks, may be allocated for storage of host operating software, the host FAT table and the like. Most of the physical storage space remains for the storage of data files.

The memory system controller 116A does not know, however, how the data received has been allocated by the host among its various file objects. All the memory controller 116A typically knows from interacting with the host is that data written by the host to specific logical addresses are stored in corresponding physical addresses as maintained by the controller's logical-to-physical address table 163.

In a typical memory system, a few extra blocks of storage capacity are provided than are necessary to store the amount of data within the address space 161. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 171, are typically maintained in an erased block pool.

When the host writes data to the memory system, the controller 116A converts the logical addresses assigned by the host to physical addresses within a metablock in the erased block pool. Other metablocks not being used to store data within the logical address space 161 are then erased and designated as erased pool blocks for use during a subsequent data write operation.

Data stored at specific host logical addresses are frequently overwritten by new data as the original stored data become obsolete. The memory system controller 116A, in response, writes the new data in an erased block and then changes the logical-to-physical address table for those logical addresses to identify the new physical block to which the data at those logical addresses are stored. The blocks containing the original data at those logical addresses are then erased and made available for the storage of new data. Such erasure often must take place before a current data write operation may be completed if there is not enough storage capacity in the pre-erased blocks from the erase block pool at the start of writing. This can adversely impact the system data programming speed. The memory controller 116A typically learns that data at a given logical address has been rendered obsolete by the host only when the host writes new data to their same logical address. Many blocks of the memory can therefore be storing such invalid data for a time.

The sizes of blocks and metablocks are increasing in order to efficiently use the area of the integrated circuit memory chip. This results in a large proportion of individual data writes storing an amount of data that is less than the storage capacity of a metablock, and in many cases even less than that of a block. Since the memory system controller 116A normally directs new data to an erased pool metablock, this can result in portions of metablocks going unfilled. If the new data are updates of some data stored in another metablock, remaining valid metapages of data from that other metablock having logical addresses contiguous with those of the new data metapages are also desirably copied in logical address order into the new metablock. The old metablock may retain other valid data metapages. This results over time in data of certain metapages of an individual metablock being rendered obsolete and invalid, and replaced by new data with the same logical address being written to a different metablock.

In order to maintain enough physical memory space to store data over the entire logical address space 161, such data are periodically compacted or consolidated (garbage collection). It is also desirable to maintain sectors of data within the metablocks in the same order as their logical addresses as much as practical, since this makes reading data in contiguous logical addresses more efficient. So data compaction and garbage collection are typically performed with this additional goal. Some aspects of managing a memory when receiving partial block data updates and the use of metablocks are described in U.S. Pat. No. 6,763,424.

Figure 2G:
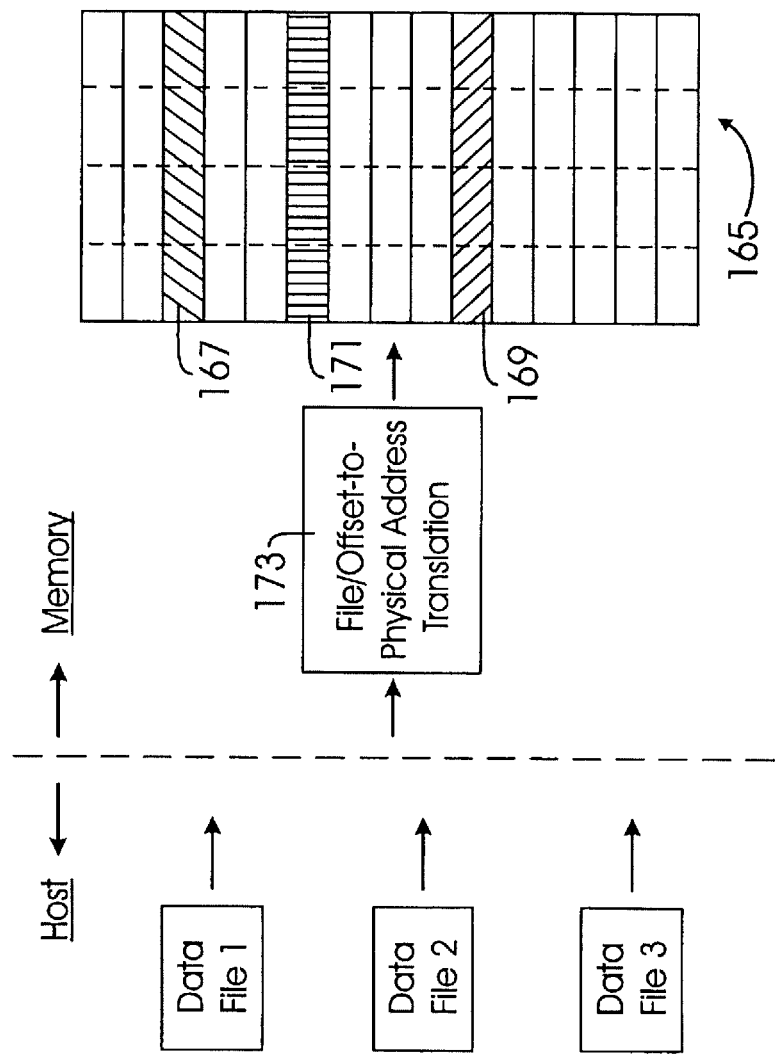
FIG. 2G shows a direct data file storage interface between a host and a re-programmable memory system, according to one aspect of the present invention.

Direct Data File Storage System:

FIG. 2G shows a layout used by flash device 116 for a "Direct Data File" storage or "Direct File Storage" ("DFS") methodology/system disclosed in co-pending patent application Ser. No. 11/060,249; Filed on Feb. 16, 2005; and the Direct Data File Storage Applications referenced above.

In a DFS device, data is accessed by host system 100 on a file-by-file basis (i.e. using a file based protocol) as described in the aforementioned patent application, that is, data is identified by a host logically using a unique file identifier ("fileID" or any other unique reference) and an offset address within the file. No logical address space is defined for the device. Host system 100 does not allocate file data to logical clusters, and directory/index table information for files is generated by flash device 116.

The host addresses each file by a unique file ID (or other unique reference) and offset addresses of units of data (such as bytes) within the file. This file address is given directly to the memory system controller 116A, which then keeps its own table of where the data of each host file are physically stored.

This file-based interface is illustrated in FIG. 2G, which should be compared with the logical address interface of FIG. 2F. An identification of each of the Files 1, 2 and 3 and offsets of data within the files of FIG. 2G are passed directly to the memory controller. This logical address information is then translated by a memory controller function 173 into physical addresses of metablocks and metapages of the memory 165.

The file-based interface is also illustrated by FIG. 2L, which should be compared with the logical address interface of FIG. 2H. The logical address space and host maintained FAT table of FIG. 2H are not present in FIG. 2L. Rather, data files generated by the host are identified to the memory system by file number and offsets of data within the file. The memory system then directly maps the files to the physical blocks of the memory cell array.

Figure 2M:
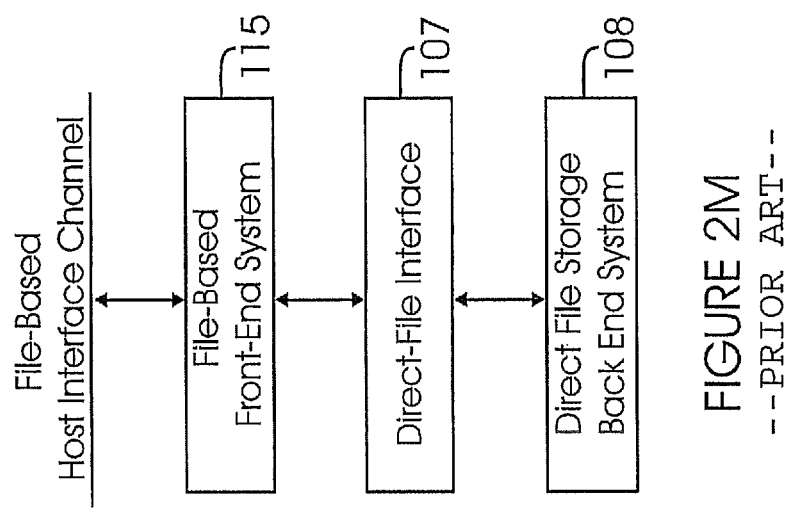
FIG. 2M shows a functional hierarchy of an example of a memory system.

With reference to FIG. 2M, functional layers of an example mass storage system being described herein are illustrated. The "Direct Data File Storage Back End System" (or direct file storage back end system) 108 communicates through a "Direct Data File Interface" (or direct file interface) 107 and a "File-Based Front-End System" 115 with a host system over a file-based interface channel. Each host file is uniquely identified, such as by a file name. Data within a file are identified by an offset address within a linear address space that is unique to the file.

Figure 2N:
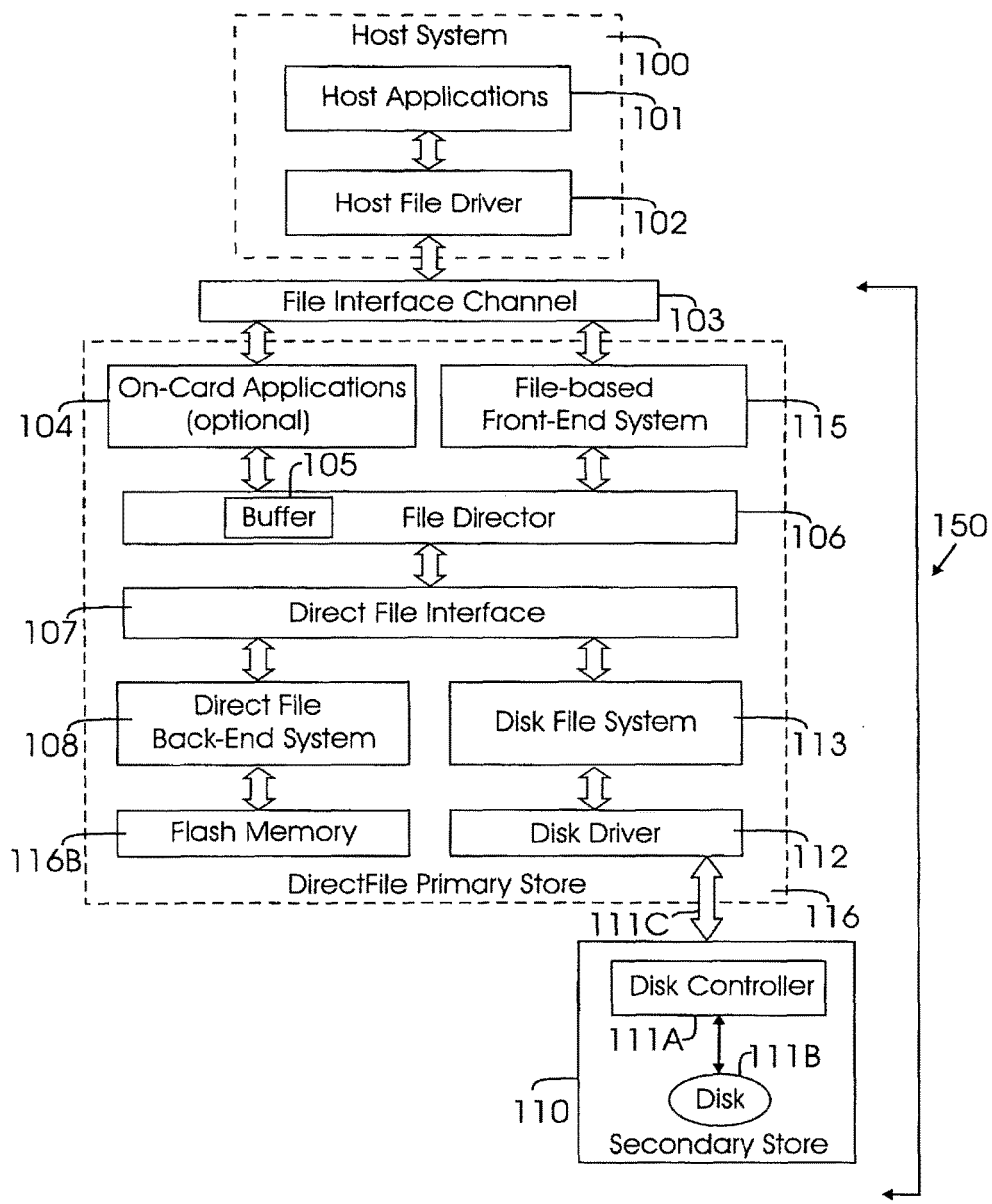
FIG. 2N shows a detailed block diagram of a virtual store, according to one aspect of the present invention.

Virtual Flash Store 150:

FIG. 2N shows host system 100 interfacing with the virtual flash store 150 having a primary store 116 (similar to primary store 116 of FIG. 2A) and a secondary store 110.

Host application programs 101 operating in host 100 interfaces via a host file driver 102 to read and/or write data to/from virtual flash store 150. Host file driver 102 provides host addresses where each file is identified by a unique file ID (or other unique reference) and offset addresses of units of data (such as bytes) within the file.

The virtual flash store 150 performs and functions as a direct data file storage device while providing the capacity of a magnetic disk.

Files that are written to the virtual store 150 are directed to the primary store 116 and are made available for subsequent read and/or write access. Files that are read from virtual store 150 are read from their current location in primary store 116, or read directly from secondary store 110 and copied to the primary store 116 for subsequent access.

A maximum number of files may be retained in primary store 116. The current location for files is moved from primary store 116 to secondary store 110 on a least recently accessed basis.

Files may be read efficiently from secondary store 110 by directing the initial access to a first block of the file stored in primary store 116 and then switching to secondary store 110 after the initial seek time.

Primary store 116 can also store application program files 104 instead of secondary store 110. Application program files 104 are copied from primary store 116 by CPU 145 and then executed out of main memory 145. Since the primary store 116 can be accessed quickly compared to secondary store 110, the overall execution time for application program files 104 is reduced.

Direct data file storage device components in primary store 116, for example, file-based front end system 115, direct data file interface 107, and direct data file back end system 108 have been described in the aforementioned co-pending patent application.

A file director module 106 manages transfer of files in and out of primary store 116 and secondary store 110, as described below in detail. The operations to move file data may be performed in accordance with garbage collection operation described in the co-pending application, whereby data may be copied as a background task or interleaved as a foreground task based on improving efficiency and overall performance.

File director 106 has access to a buffer 105 (or memory 105) that may be used to temporarily store data that is being transferred between host 100 and virtual store 150.

Primary store 116 includes a disk file system 113 and a disk driver 112 that allows primary store 116 to interface with a conventional magnetic disk 110 via a logical interface 111C. Disk file system 113 and disk driver 112 map data files at direct data file interface 107 to a conventional logical address space used by magnetic disk 110 to allow file data transfer between primary store 116 and secondary store 110.

It is noteworthy that disk file system 113 and disk driver 112 may also be used to perform background operations, such as, de-fragmentation of files that are stored on magnetic disk 111.

File director 106 uses a file locator table 106A (shown in FIGS. 2S and 2T), described below in detail to identify the store (i.e. primary and/or secondary) where data for a file is located. File locator table can be stored in flash memory 116B and a copy of all or part of table may also be cached in memory 116D.

Figures 2Q, 2R:
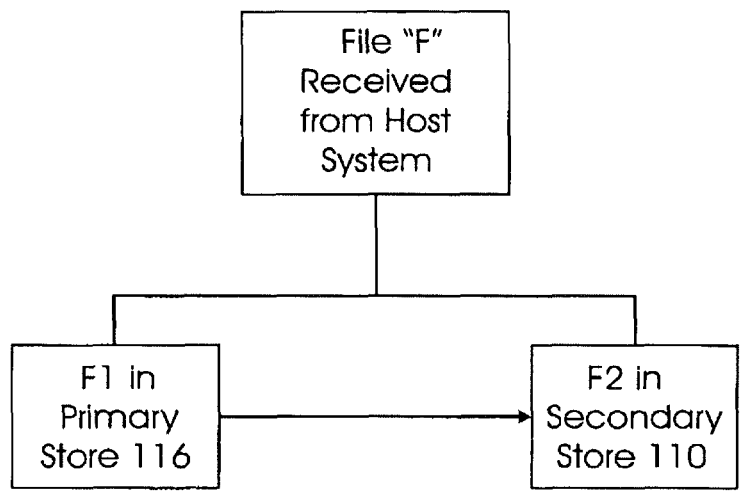
FIG. 2Q shows an example of segmenting a file, according to one aspect of the present invention.
FIG. 2R shows an example of a table used for segmenting a file, according to one aspect of the present invention.
Figure 2S:
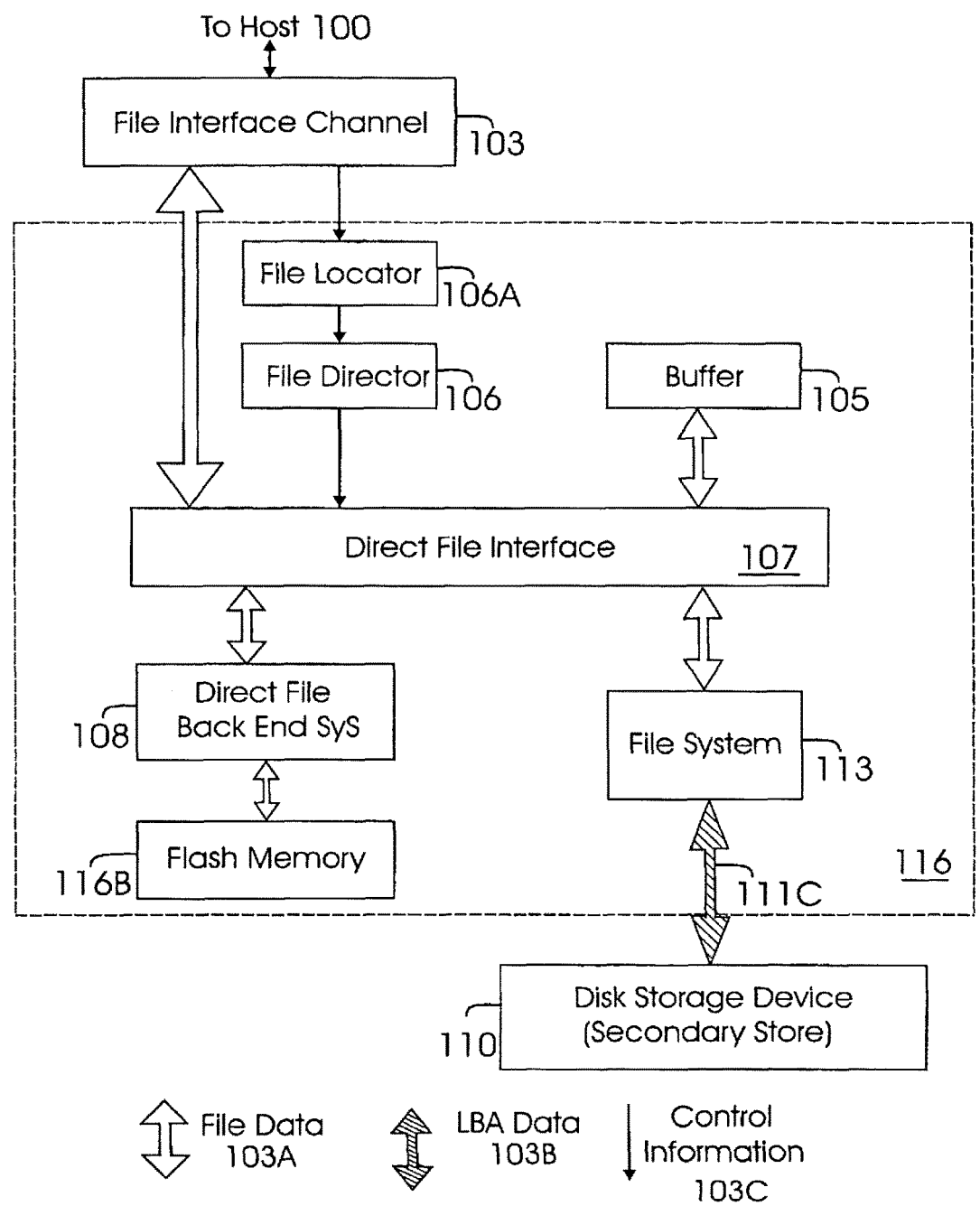
FIG. 2S shows yet another block diagram of a storage system with a file locator interfacing with a file director module, according to one aspect of the present invention.

FIG. 2S shows a block diagram of mass storage system 150 (similar to the system shown in FIG. 2N) with file locator table 106A interfacing with file director 106. FIG. 2S also shows the file data path (identified as 103A) received from host 100 via file interface 103; LBA data path 103B via logical interface 111C and control information 103C that flows between file director 106 and direct data file interface (or direct file interface) 107.

FIG. 2T shows file locator table 106A entries. File locator table 106A contains one entry (under column 106B) for each file that is stored in storage system 150. Each entry records the start and end address (column 106C) of a run of data with sequential file offset addresses that is stored in the primary store 116; and the start and end address of a run of data with sequential file offset addresses that is stored in the secondary store 110 (column 106D). Valid data for the file may exist in either one or both stores.

The file locator table 106A is updated when data is written to a store, copied between stores, or deleted from a store. The file locator table 106A identifies only the store in which data with a specific offset address within a file is located. It does not identify the physical location within the store at which the data is located. This is done by the normal file directory and file indexing structures within the two stores.

Mass storage system 150 has several advantages. For example, in one aspect of the present invention, secondary store 110 can be placed in an available or unavailable state. An unavailable state can mean that the device is physically unavailable or that a memory controller cannot access the device until it becomes available.

Primary store 116 is always in an available state and hence accessible by memory controller 116A. When the secondary store 110 is in an available state, then file director 106 can access both the primary store 116 and secondary store 110.

When file interface channel 103 receives data from the host system, controller 116A can write the data in either the primary store 116 or the secondary store 110. If data is first written in primary store 116A, then it is copied to the secondary store 110, as a background operation.

Controller 116A chooses the appropriate storage device based on optimizing storage space usage and for allowing a host to complete the write operation as quickly as possible. Since, primary store 116A has a lower seek time than the secondary store 110; it will be advantageous to first write to the primary store 116A and then copy to the secondary store 110.

In another aspect, virtual flash store 150 provides a fast system boot and fast application start-up. Information that is required by a host system during its boot process, for example, operating system and configuration files, can be stored on a file-by-file basis in primary store 116. In this situation, primary store 116 operates as a read cache and its fast random read access characteristics allow much faster system access and start-up.

Information that is used for the boot process can be identified and secured so that is it not over-written. This initial information can be copied from secondary store 110 or stored in primary store 116. Application software files (shown as 104) can be treated the same way so that applications can be launched quickly by the host system.

Virtual store 150 can also operate as a low power storage device. Typically, secondary store 110 consumes more power than the flash memory based primary store 116. Primary memory store 116 can be used as a read/cache device by maintaining a copy of recently accessed information in primary store 116 together with a copy of recently written information. This will allow virtual file store 150 to respond quickly to a host request by means of a cache hit in primary store 116. Controller 116A can then spin down the secondary store 110 to reduce power consummation. This is especially advantageous in portable applications, for example, laptops, notebooks and others.

Virtual file store 150 also operates as a shock-tolerant storage device. Controller 116A can spin down secondary store 110 when the device is being used in an environment with a risk of high mechanical shock. Controller 116A firmware can be programmed so that it spins down secondary store 110 when such an environment is probable. Primary store 116 operating as a read/write cache provides the host system with the information that a host needs to function.

Once secondary store 110 becomes available, then data is synchronized between primary store 116 and secondary store 110. For a portable device, secondary store 110 becomes available once the device is placed in a docking station. In another aspect, motion detection circuitry can be used to determine if the system is no longer in a shock prone environment. Also, a user can manually change the settings so that secondary store 110 is available at any given time. In another instance, by plugging the system in a power outlet may signal the controller 116A to activate the secondary store 110.

Virtual flash store 150 with its' primary store 116 and secondary store 110 provides a reliable storage device with short-term backup that is readily accessible. Primary store 116 can operate as a write cache and retain information, even after the information is transferred to secondary store 110. If the information is maintained for as long as possible, and is only over-written when space is needed, then the write cache provides a copy of recently written information. This provides a safeguard, in case secondary store 110 crashes due to a disk failure and loses data.

Primary store 116 operates as a read cache when data that is read from secondary store 110 is copied and stored in primary store 116. Copied data is stored in flash memory 116B and controlled by file director 106. It is noteworthy that data being read from secondary store 110 may be selectively copied. This could be on the basis of the frequency with which data is read, the nature, i.e. the type and size of the file that is being read, or any other criterion.

Controller 116A firmware may be programmed to configure primary store 116 to operate as a read cache based on such criterion.

As stated earlier, primary store 116 can also operate as a write cache. When host system 100 sends data via file interface channel 103, file director 106 can store the data completely or partially in flash memory 116B and then copy the data to secondary store 110 when virtual store 150 is not being used. The amount of data that will be copied in primary store 116 will depend on the size of the file and the amount of free space available in primary store 116 at a given time. This allows a host system to write quickly because primary store 116 has a faster access time.

In yet another aspect of the present invention, memory controller 116A splits a file that is received from the host into two or more segments. One segment is stored in primary store 116 and the other segment is stored in secondary store 110. The segment that is stored in primary store 116 includes enough information for the file so that the file can be easily located when the host requests it. When the host wants to read the complete file, it can quickly access the first segment that is stored in primary store 116 while the second segment is being obtained from secondary store 110.

FIG. 2Q illustrates the foregoing concept. A File "F" is received from the host via file interface 103 in response to a write command. Memory controller 116A initially writes the entire file in primary store 116. After the host write operation is complete, memory controller 116A splits the file data into two parts, F1 and F2. It is noteworthy that memory controller 116A may split the file into plural segments, in real time, as data is being received, instead of first waiting to copy the data to the primary store 116.

F1 is stored in primary store 116 and F2 is copied to secondary store 110. Typically, the copy operation is conducted as a background operation.

The size of segments F1 and F2 depend on the seek time to access secondary store 110 and primary store 116, respectively, the overall size of the file and the rate at which data can be transferred to the host. Memory controller 116A splits the file to ensure that data transfer to the host is efficient and memory space usage is optimum.

When the host wants to read File F, it will first access segment F1 that is stored in primary store 116. Since primary store 116 has faster access time, the host can access F1 at a faster rate. While F1 is being transferred to the host, controller 116A obtains segment F2 from secondary store 110 that has a slower seek time. Hence, when the F1 transfer is complete, F2 is already obtained and ready to be transferred. This improves the overall efficiency of read operations from virtual store 150.

File locator 106A tracks where file segments, F1 and F2 are stored (FIG. 2T and partial table shown in FIG. 2R). The partial table of FIG. 2R shows the top-level location of a segment (for example, segment 1 (i.e. F1) stored in primary store 116 and segment 2 stored in secondary store 110). In order to transfer file data, file director 106 accesses file locator 106A to determine where a particular segment is located.

In yet another aspect of the present invention, caching files, instead of caching logical block addresses provides an advantage over prior art system. In previous dual storage media systems, the host has a logical interface between both the flash device and the hard disk. Data that is transferred to/from the host is identified by logical addresses and the caching takes place on logical address instead of a file. There is no way to ensure that a complete range of logical addresses for a file is located in the correct device at the right time.

For example, a system may want to ensure that a .exe file is stored in the flash device when the hard disk (secondary store) is powered down or when the disk is removed (for example, in undocked portable equipment). In previous systems, this is achieved by caching logical addresses for the .exe file in flash and then locking them in the flash device. The caching is performed when logical addresses were previously accessed from the disk. However, there is no guarantee that the logical addresses represent the entire .exe file. It may only be for functions within the application that are used when the portable equipment is docked and the disk is available. Other functions that are used in an undocked mode may not have been cached at all.

Mass storage system 150 solves the foregoing shortcoming by caching complete files, instead of a range of logical addresses. This ensures that the entire .exe file (as discussed in the foregoing example) is cached in primary store 116 is available for a fast access.

Process Flow:

In one aspect of the present invention, file director 106 in primary store 116 performs various operations that are summarized below and then described in detail with respect to the process flow diagrams illustrated in FIGS. 3-6 and 8A/8B-9:

When a new file is opened for writing, it is opened within primary store 116. Mass storage system 150 behaves as a direct data file device for writing, updating and reading data within this file.

When an existing file is opened for writing, it is also opened in primary store 116. If the current version is resident on secondary store 110, then it is copied to primary store 116. This is performed as a background operation, but may also be interleaved at low duty cycle with reading or writing other data in primary store 116. Again, mass storage system 150 behaves as a direct data file device for writing, updating and reading data within this file.

When an existing file is opened for reading, the latest version of the file is opened from its location in either the primary store 116 or secondary store 110. If the file is read from secondary store 110, it is copied to primary store 116. The file is preferably copied concurrently while being read from secondary store 110, but it may be copied as a separate background operation or interleaved with reading or writing other data in the primary store as a low duty cycle operation.

When a file is closed, it may be copied from primary store 116 to secondary store 110. This is normally done on a least recently used basis, while retaining a maximum number of files in primary store 116. Such copying may be performed as a pre-emptive background operation while the most active current file versions remain in the primary store 116, until the files are deleted.

Some files may be locked to the primary store 116 and hence are always read from the primary store 116. For example, files associated with the operating system and application programs 104 are always read from primary store 116. Some files in primary store 116 are also copied to secondary store 110 for security as a back up.

When an active version of a file is assigned to the secondary store 110, then an initial block of data for the file may be retained in primary store 116.

When a file whose current version is in the secondary store 110 is read, its first block of data may be read from the primary store 116 while the secondary store 110 is performing a seek for subsequent data. This provides faster access to stored file data.

When a file is opened for reading by a certain class of on card application (104), then copying of the file from secondary store 110 to the primary store 116 may be suppressed. This allows an application such as a virus checker to operate directly on a large number of files in secondary store 110.

It is noteworthy, that when the host interface is inactive, files are copied by transferring units of data continuously until a command is received at the host interface or all pending files are copied.

When the host interface is active, files are copied by interleaving writing/reading units of data from/to the host interface with copying units of data between a buffer (105, FIG. 2N) and the inactive store. Operations to write/read data from/to the host interface from/to either the primary or the secondary store may be interleaved with operations to copy data to/from the other store in such a way that the operations in the two stores are largely concurrent.

The unit of data may be any convenient unit. For example, it may be a sector of data comprising 512 bytes, which is the minimum unit of data that may be addressed in secondary store 110. It may also be a page of data, which is the minimum unit of data that can be programmed in flash memory 116B. A page may comprise 1, 2, 4, 8 or more sectors. It may also be a metapage of data, which is the maximum unit of data that can be programmed in flash memory 116B. A metapage may comprise 1, 2, 4, 8 or more pages. It may also be a unit of data larger than a metapage. The unit of data being written/read in one store may have a different size from the unit of data being written/read in the other store.

Figure 3:
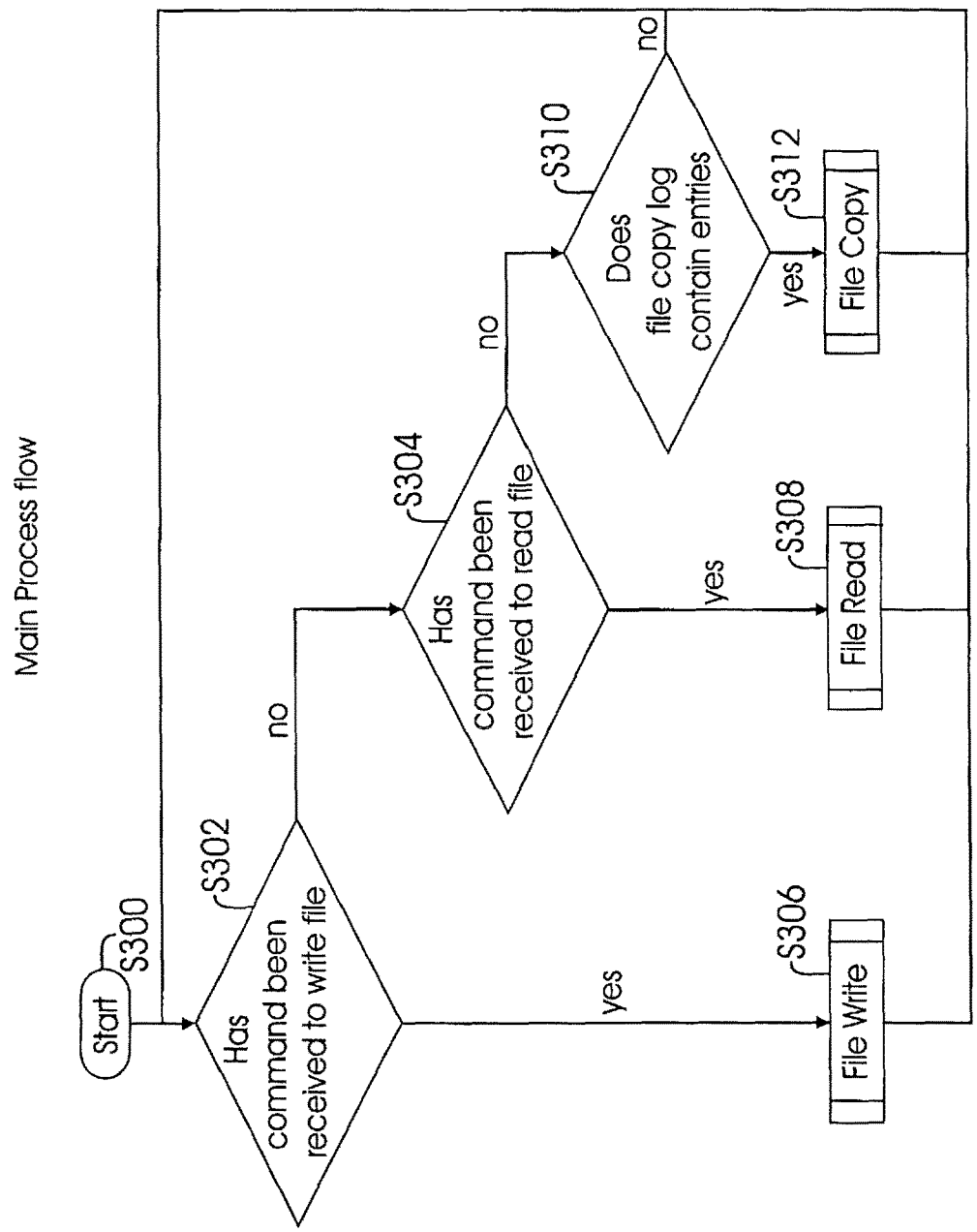
FIG. 3 shows an overall process flow diagram for using the virtual store, according to one aspect of the present invention.

Turning in detail to the process flow diagrams, FIG. 3 shows an overall process flow diagram of executable process steps for transferring data between host system 100 and virtual store 150, according to one aspect of the present invention. Turning in detail to FIG. 3, the process starts in step S300. In step S302, controller 116A determines if a command has been received to write a file. If yes, then the process moves to step S306, which is described in FIGS. 4(*i*) and 4(*ii*), herein collectively referred to as FIG. 4.

If there is no write command, then in step S304, controller 116A determines if a command for a file read operation has been received. If a read command is received, then the process moves to step S308, described below with respect to FIG. 5.

If a read command was not received in step S304, then in step S310, controller 116A determines if a file copy log contains any entries. If yes, then the process moves to step S312, described below in FIGS. 6(*i*), 6(*ii*), and 6(*iii*), herein collectively referred to as FIG. 6. If no entries exist, then the process moves back to step S302.

Figure 4I:
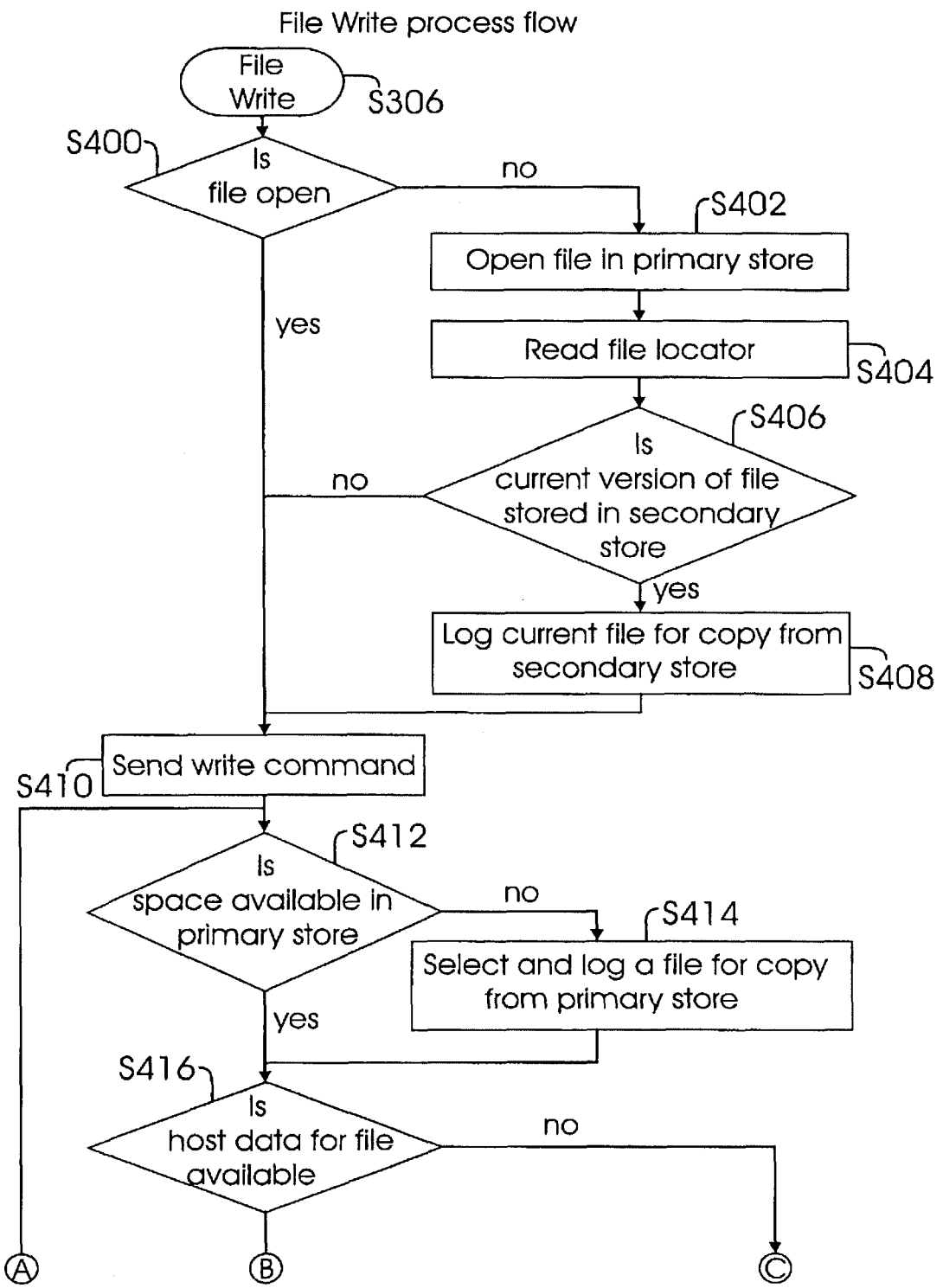
FIGS. 4(i) and 4(ii) show a flow diagram for the write process, using the virtual store, according to one aspect of the present invention.
Figure 4:
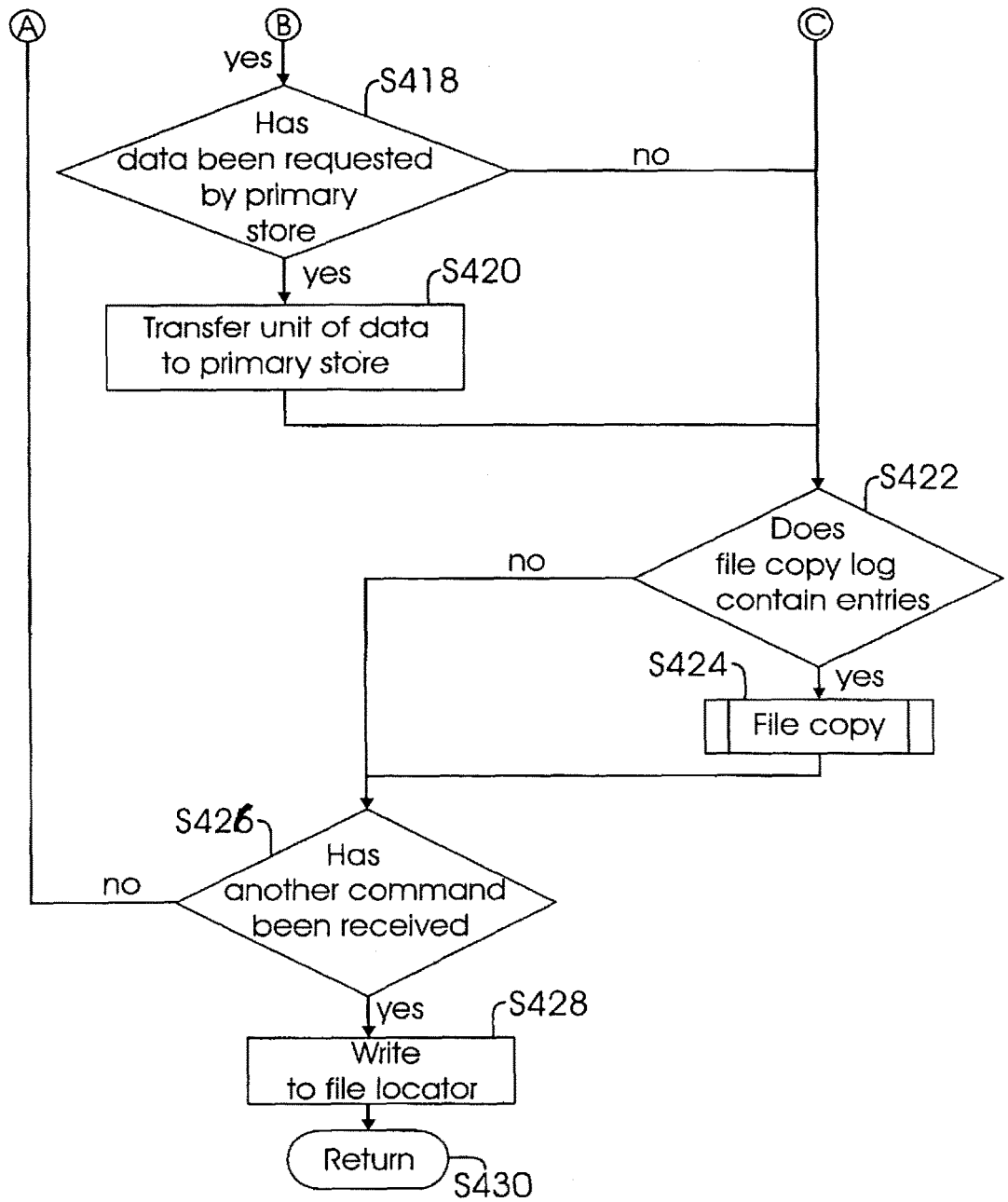

File Write Process Flow:

FIGS. 4(*i*) and 4(*ii*) show a process flow diagram of executable process steps for writing data to virtual store, according to one aspect of the present invention. The file write process begins in step S306, as shown in FIG. 3.

Referring to FIG. 4(*i*), in step 400, controller 116A determines if a target file is already open. If the file is not open, then in step S402, the target file is opened in primary store 116. The file is opened using the file-based interface.

In step S404, file locator 106A is read. The file locator 106A is used to identify the location of files as being either stored in the primary store 116 or secondary store 110.

Figure 7:
FIG. 7 shows a copy log maintained by the virtual store, according to one aspect of the present invention.

After the file location information is read, in step S406; controller 116A determines if the current version of the file is stored in the secondary store 110. If the file is located in the secondary store 110, then an entry is added to a copy log 700 (shown in FIG. 7) that is maintained by primary store 116. The copy log may be stored in memory 116D and contains a listing of various copy operations that need to be performed. The copy log has an entry for each file that needs to be copied. It also includes an entry that identifies where the file may be located, for example, primary store 116 or secondary store 110. The copy log also includes an entry that identifies the destination, i.e., where the file is copied to, i.e., primary store 116, secondary store 110 or buffer 105.

If the current version of the file is not stored in the secondary store 110, then the process moves to step S410. In step S410, the write command is sent to the direct data file back-end system 108.

In step S412, file director 412 determines if space is available to write data. Since data is written as a single unit a low threshold value is used to determine if space is available to write data. The threshold value is set to define a capacity at which only a small number of units of data may still be written to the primary store 116, but at that point a file copy operation from the primary store 116 to secondary store 110 should be started to create more available space in primary store 116. If no space is available, then in step S414, a file is selected for copying from primary store 116.

If space is available in step S412, then in step S416, file director 106 determines if data from host system 100 is available. If host data is not available, then the process moves to step S422, shown in FIG. 4(*ii*).

If data is available, then in step S418, shown in FIG. 4(*ii*), file director 106 determines if data has been requested by primary store 116. If yes, then a unit of data is transferred to the primary store 116. If data has not been requested by primary store 116, then the process moves to step S422.

In step S422, file director 106 determines if an entry to copy a file exists in the copy log 700. If yes, then one or more data units for the file is copied in step S424. If an entry does not exist, then in step S425, file director 106 determines if another command has been received. If no other command is received, the process reverts back to step S412 in FIG. 4(*i*). If another command is received, then in step S428, the file locator is updated to reflect the current location of files in either the primary store 116 or the secondary store 110. Thereafter, in step S430, the process returns to step S302 in FIG. 3.

Figure 8A:
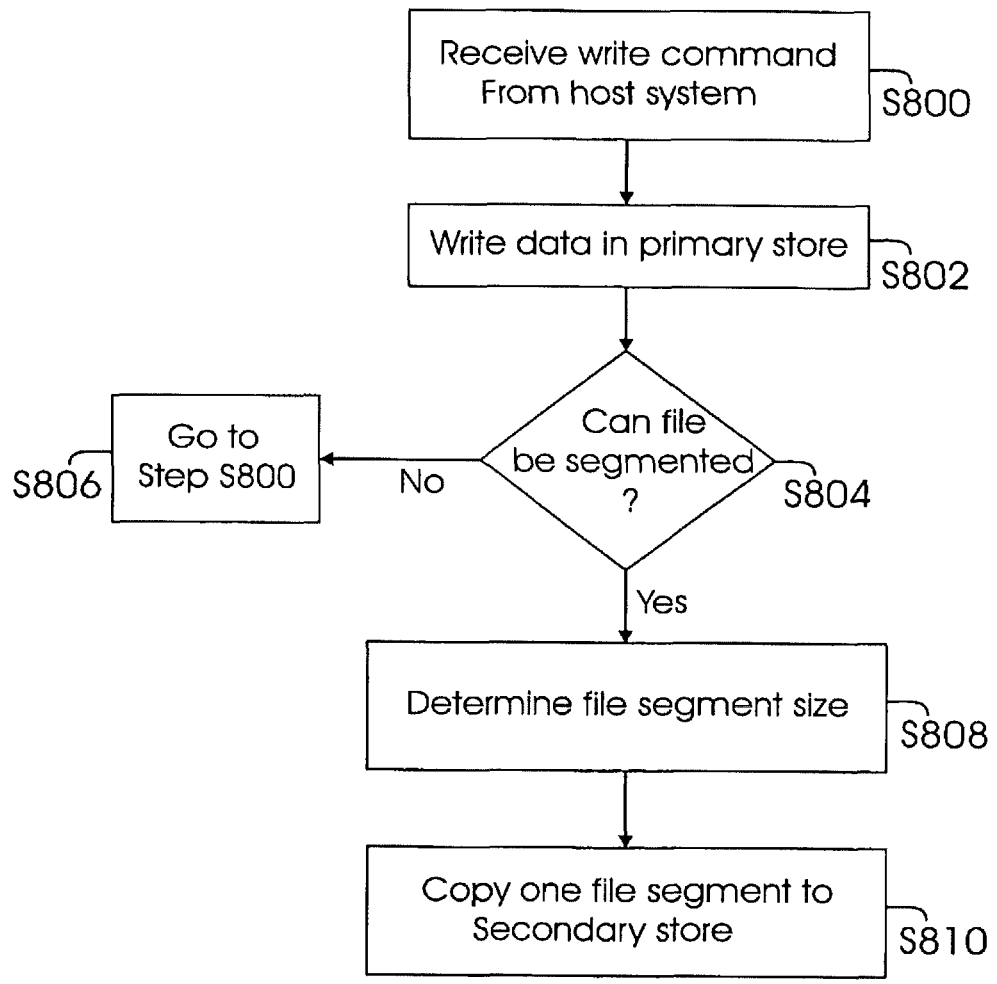
FIGS. 8A and 8B show process flow diagrams for writing file segments, according to one aspect of the present invention.

FIG. 8A shows a process flow diagram where memory controller 116A segments an incoming file so that one segment can be stored in primary store 116 and the other segment in secondary store 110. Turning in detail to FIG. 8A, in step S800, memory controller 116A receives a write command from the host system.

In step S802, memory controller 116A writes a file in primary store 116. After the file is written, in step S804, memory controller 116A determines if the file can (or should) be segmented. If the file cannot/should not be segmented, then the process returns to step S800 (in step S806).

If the file is segmented, then in step S808, memory controller 116A determines the file segments (F1 and F2, FIG. 2Q) and in step S810, the file segment(s) are copied to the secondary store 110. The copy operation takes place as a background operation, as described below with respect to FIGS. 6(*i*), 6(*ii*), and 6(*iii*).

Figure 8B:
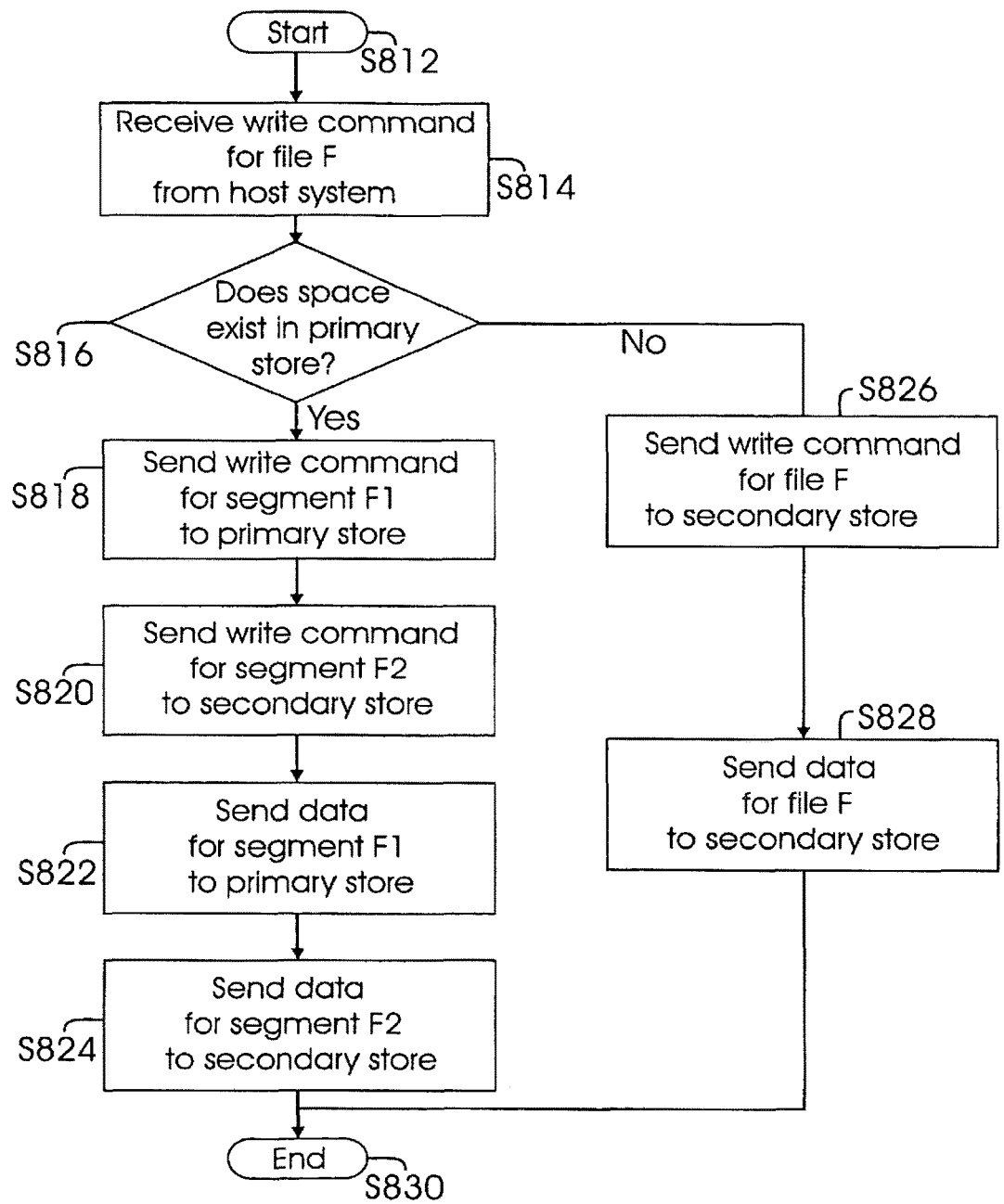

FIG. 8B shows yet another flow diagram for handling file segmentation, according to one aspect of the present invention. The process starts in step S812 and in step S814, a write command is received for a file ("F") from host system 100.

In step S816, memory controller 116A (via file director 106) determines if space exists in primary store 116 (similar to step S412, FIG. 4). If space is available in primary store 116, then in step S818, a write command is sent to primary store 116 to write a file segment (for example, F1, a file header). In step S820, file director 106 sends a write command to secondary store 110 to write file segment F2. It is noteworthy that steps S818 and S820 may occur simultaneously after step S816.

In step S822, at least a unit of data for file segment F1 is sent to primary store 116. It is noteworthy that the write command in step S820 is sent before any data unit is written in step S822. This allows secondary store 110 to go through it's seek time while a data unit is being written in primary store 116. This expedites the overall write process.

In step S824, data for segment F2 is sent to secondary store 110 and the process ends in step S830.

If in step S816, space is unavailable in primary store 116, then in step S826, a write command is sent secondary store 110 and in step S828, data for the file is sent to secondary store 110.

Figure 5:
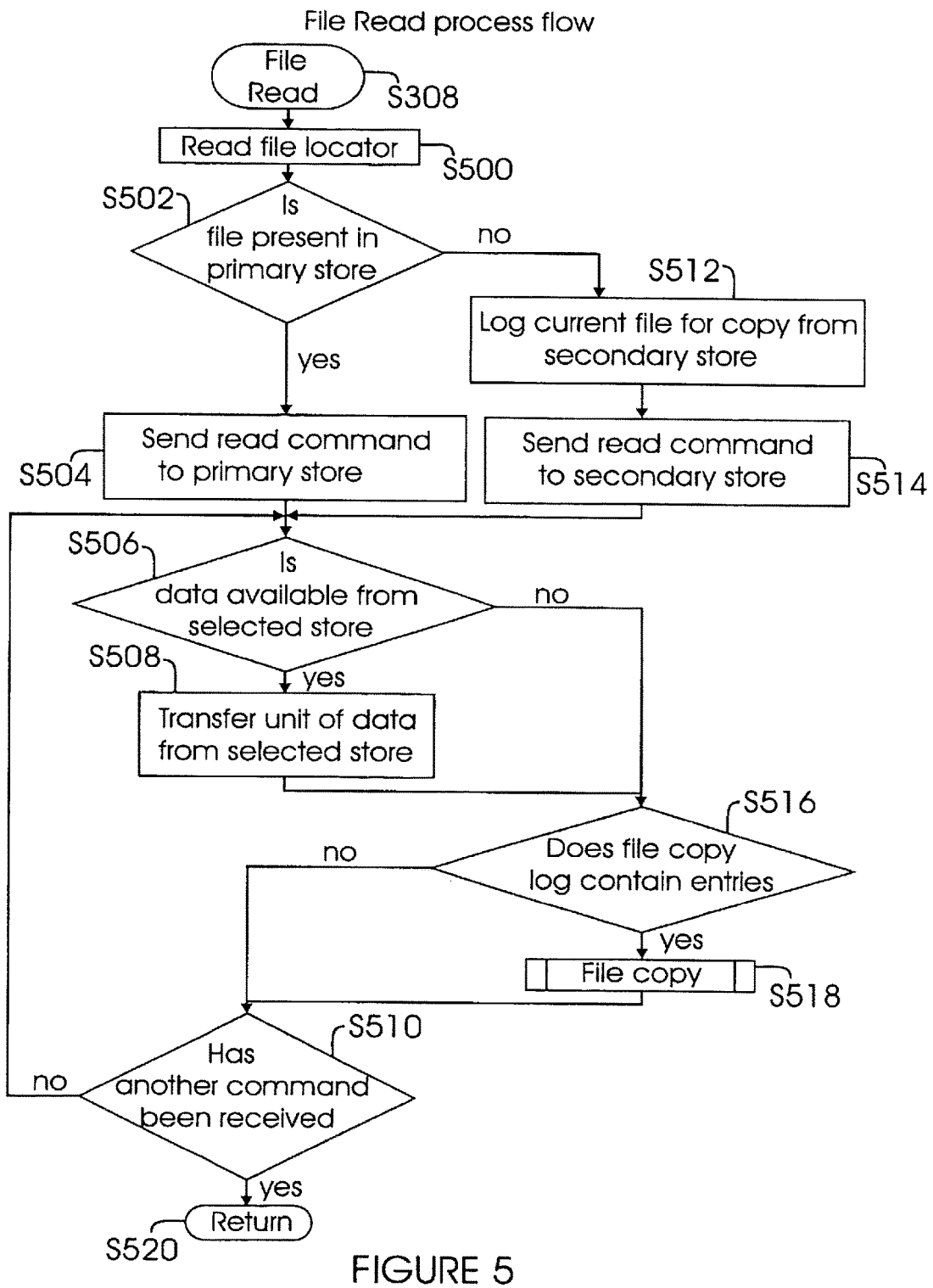
FIG. 5 shows a flow diagram for the read process, using the virtual store, according to one aspect of the present invention.

File Read Process:

FIG. 5 shows a process flow diagram for the file read process, according to one aspect of the present invention. The file read process begins from step S308 of FIG. 3. File director 106, in step S500, reads the file locator 106A.

In step S502, the file director 106 determines if the file is present in the primary store 116. If yes, then in step S504, the read command is sent to the primary store 110. If the file is not located in primary store 110, then in step S512, the current file is logged for copying from the secondary store 110 and in step S514, the read command is sent to secondary store 110 and the process moves to step S506.

In step S506, file director 106 determines if data is available from the selected store (i.e. primary store 116 or secondary store 110). If yes, then in step S508, data is transferred from the selected store. If data is not available, then the process moves to step S516, where file director 106 determines if a file copy log entry exists. If an entry exists, then in step S518, one or more data units for the file is copied. If the entry does not exist, then in step S510, file director 106 determines if another command has been received. If another command is not received, then the process reverts back to step S506, other wise, in step S520, the process moves to step S302 (FIG. 3).

Figure 9:
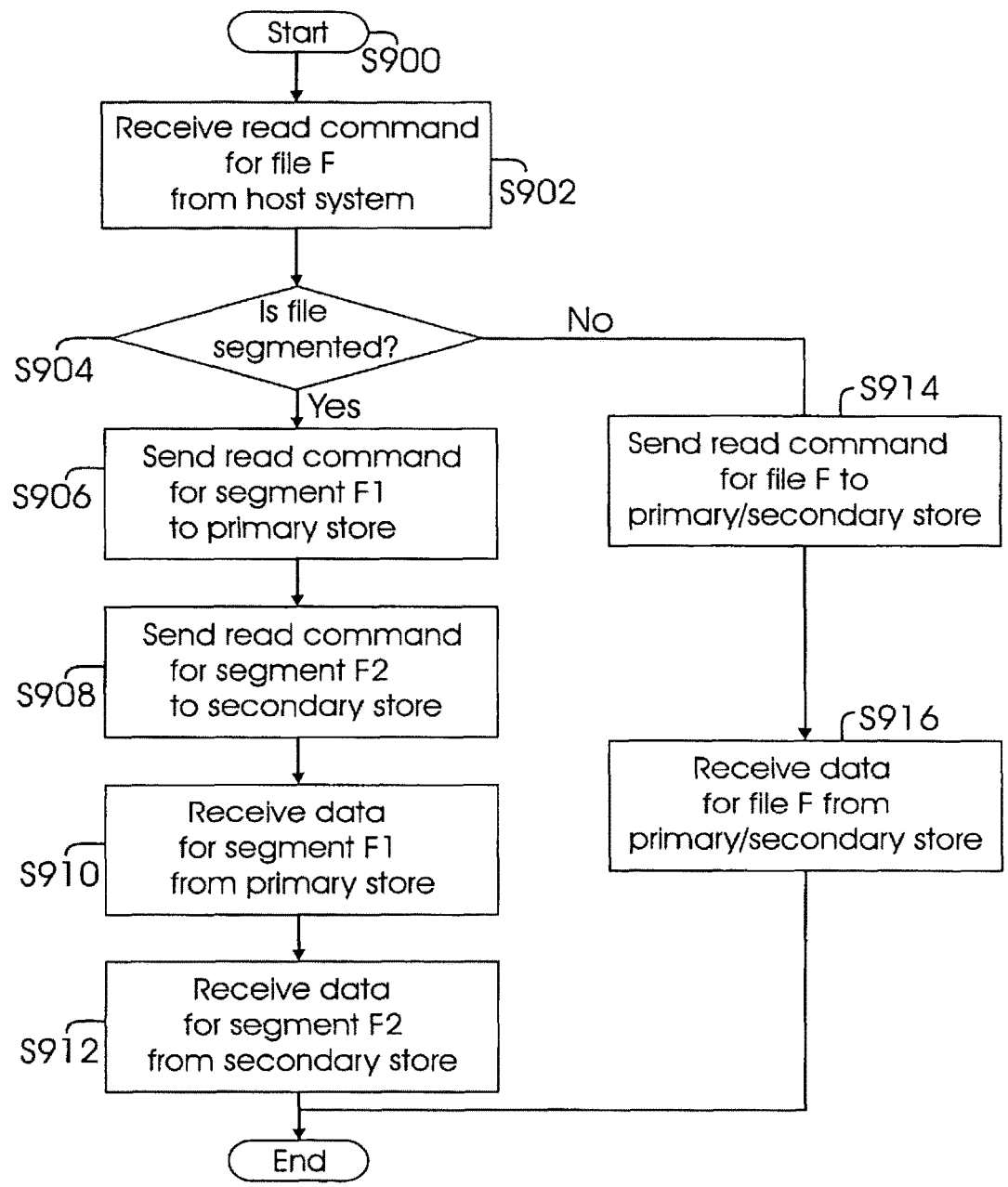
FIG. 9 shows a flow diagram for reading a segmented file, according to one aspect of the present invention.

FIG. 9 shows a process flow diagram for reading a file that has been stored in two (or more segments), as described above with respect to FIGS. 8A and 8B, according to one aspect of the present invention. Turning in detail to FIG. 9, the process starts in step S900, and in step S902, a read command for a file ("F") is received from the host system 100.

In step S904, file director 106 determines if the requested file ("F") is segmented. If the file is not segmented, then in step S914, the read command for the file is sent to primary store 116/secondary store 110 based on where the file is stored. In step S916, data for the file is received from primary store 116 or secondary store 110 and the process ends.

If the file is segmented, then in step S906, file director 106 sends a read command for segment F1 to memory controller 116A of primary store 116. In step S908, file director 106 also sends a read command for segment F2 to secondary store 110.

In step S910, data for segment F1 is received from primary store 116. It is noteworthy that while data is being received from primary store 116, secondary store 110 is completing it's seek time to deliver data for segment F2. This improves the overall efficiency of the read process.

In step S912, data for segment F2 is received from secondary store 110 and the process ends.

Figure 6L:
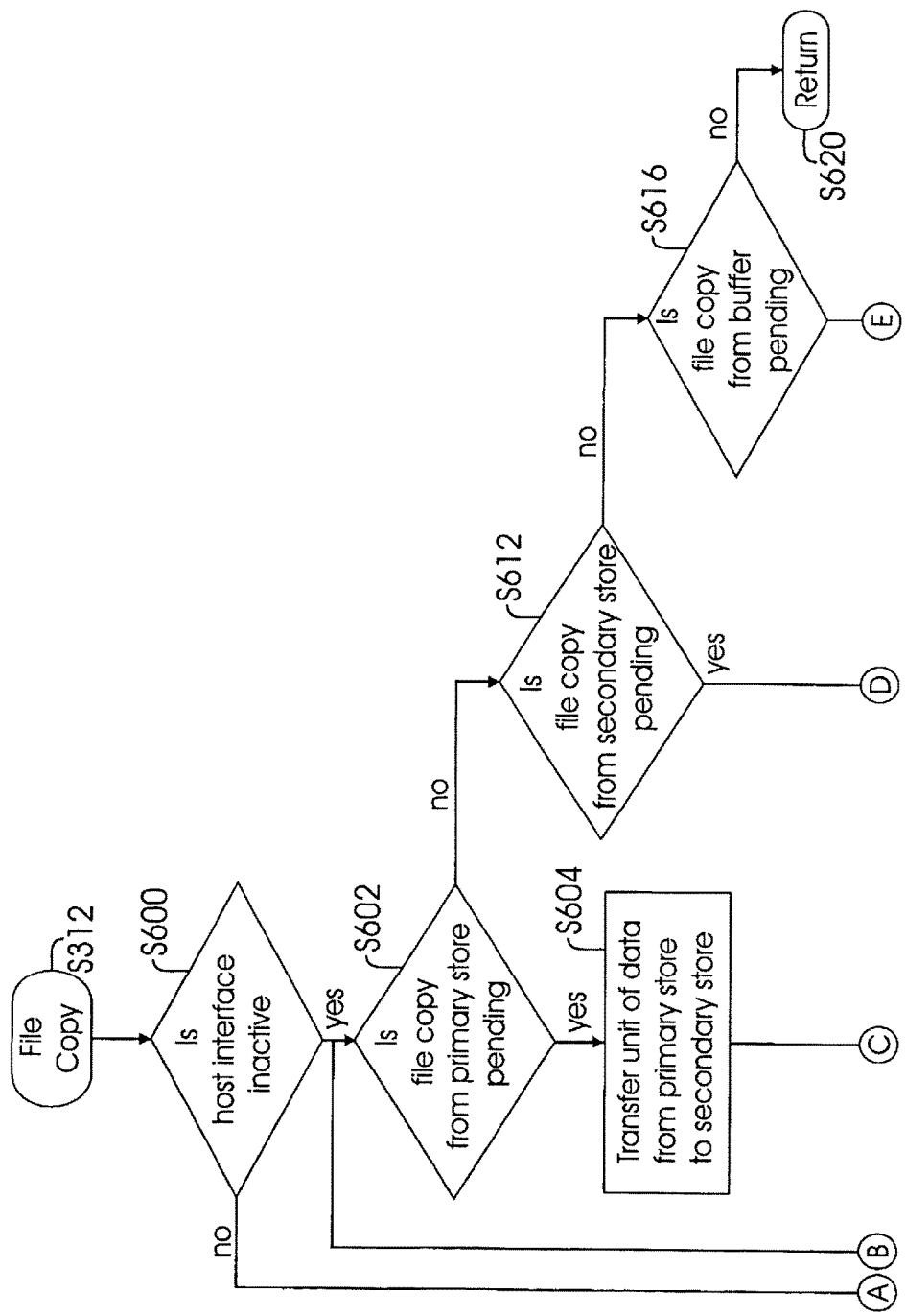
FIGS. 6(i), 6(ii), and 6(iii) show a flow diagram for the copy process, using the virtual store, according to one aspect of the present invention.
Figure 6:
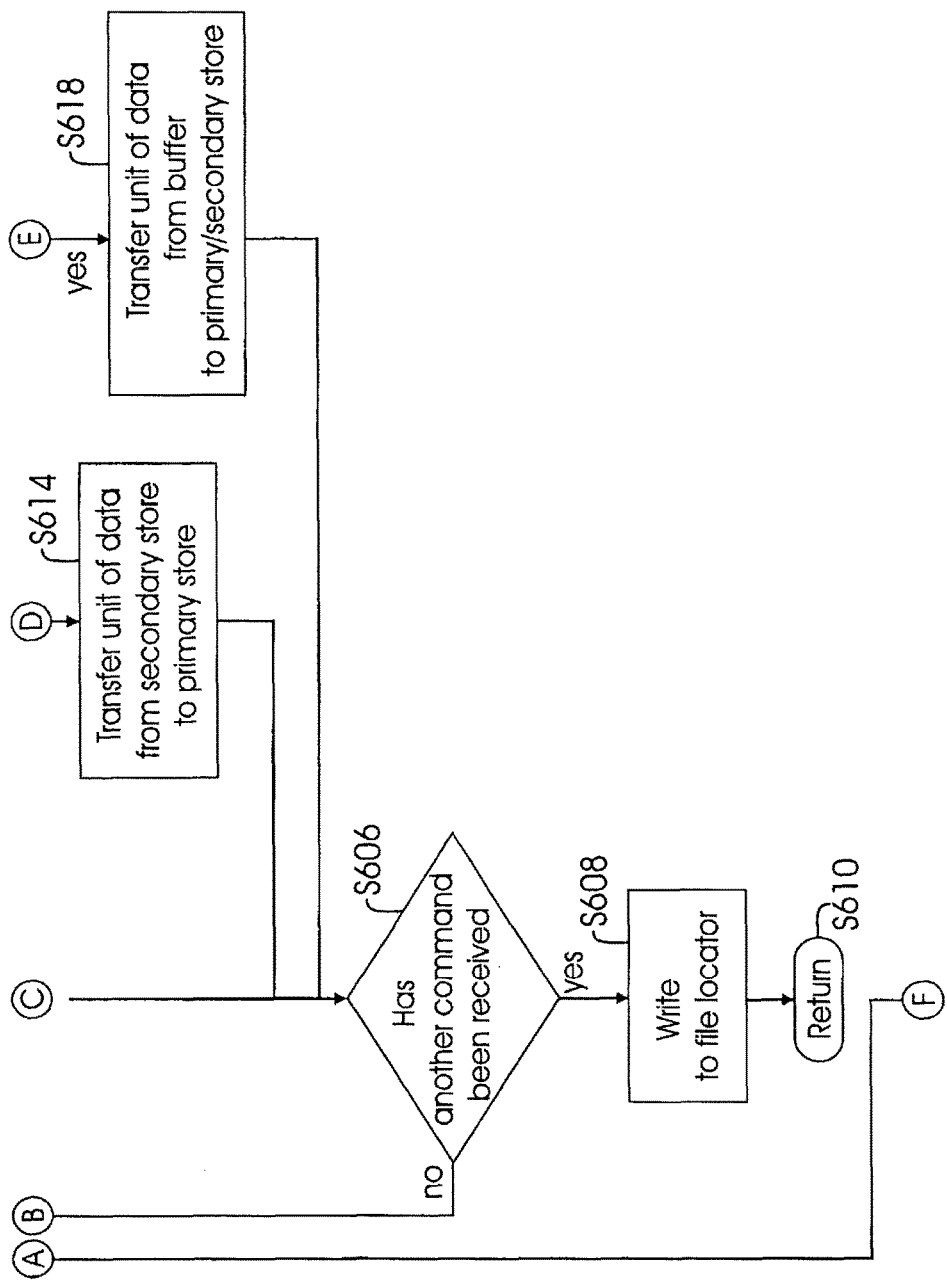

File Copy Operation:

FIGS. 6(i), 6(ii), and 6(iii) show a flow diagram for copying data, according to one aspect of the present invention. The flow diagram is to execute the process step S312 of FIG. 3.

Turning in detail to FIG. 6(i), in step S600, file director 106 determines if the host interface is inactive, i.e., if there is an active command from host 100 to transfer data. If there is an active command, then the process moves to step S622 in FIG. 6(iii), which is described below.

If the host interface is inactive, then in step S602, file director 106 determines if a file copy operation from primary store 116 is pending, i.e. if a copy operation is in progress or waiting to occur. If a file copy operation is pending, then in step S604, at least one unit of data for a file is copied from primary store 116 to secondary store 110 and the process moves to step S606 in FIG. 6(ii), which is described below.

If a file copy operation is not pending in step S602, then in step S612, file director 106 determines if a file copy operation is pending from secondary store 110. If the operation is pending, then in step S614, which is shown in FIG. 6(ii), at least a unit of data is transferred from secondary store 110 to primary store 116 and the process moves to step S606.

Referring again to FIG. 6(i), step 612, if a file copy operation from secondary store 110 is not pending, then in step S616, file director 106 determines if a file copy operation is pending from buffer 105. If a file copy operation is pending from buffer 105, then in step S618, which is shown in FIG. 6(ii), at least a unit of data is transferred from buffer 105 to either primary store 116 or secondary store 110 and the process moves to step S606. Referring again to FIG. 6(i), step 616, if a file copy operation is not pending then in step S620, the process reverts back to step S302 in FIG. 3.

Referring to FIG. 6(ii), in step S606, file director 106 determines if another copy command has been received. If another command has not been received, then the process reverts back to step S602. If a command has been received, then in step S608, the file locator 106A is updated to reflect the current location of files and the process returns to step S302 (in step S610).

Referring to FIG. 6(iii), and turning in detail to step S622, the file director 106 determines if primary store 116 is active. If yes, then in step S624, file director 106 determines if a file copy operation is pending between buffer 105 and secondary store 110. If a file operation is pending, then in step S625, at least a unit of data is transferred between buffer 105 and secondary store 110. If a file operation is not pending in step S624, then in step S634, the process returns to step S302.

If primary store 116 is not active in step S622, then in step S628, file director 106 determines if secondary store 110 is active. If the secondary store 110 is not active, then in step S634, the process returns to Step S302.

If the secondary store 110 is active, then in step S630, file director 106 determines if a file copy operation is pending between buffer 105 and primary store 116. If the file operation is pending, then in step S632, at least a unit of data is transferred between buffer 105 and primary store 116.

If a file copy operation is not pending in step S630, then the process moves to step S634.

The file copy operation described above transfers a unit of data while host 100 is inactive. The operation is conducted in background, interleaved with a write operation from host 110 to virtual store 150. The ratio of interleaving (i.e., the amount of write data written from host 110 and the amount of data copied) may be varied by varying the size of the unit of data that is being copied. The size of the unit of data is chosen to optimize performance.

Listing of Operations:

FIG. 2P shows Table 1 that provides a list of data transfer operations by file director 106.

Operation 201 is a preferred file write operation from host 100 to primary store 116. Operation 202 is a write operation from host 100 to secondary store 110. This operation may be used if insufficient space is available in primary store 116.

Operation 203 is a file read operation from primary store 116 to host 100, when a current version of the file resides in primary store 116. Operation 204 is used to read file data from secondary store 110.

Operation 205 is a file copy operation. During this operation file data is copied from primary store 116 to secondary store 110. Operation 205 is preferably performed when host interface 103 is inactive.

Operation 206 is also a file copy operation. During this operation file data is copied from secondary store 110 to primary store 116. Operation 206 is also preferably performed when interface 103 is inactive.

Operations 207-210 are conducted using buffer 105 and may occur concurrently with transfer of data from host 100 to/from secondary store 110 and/or host 100 to/from primary store 116. Operation 207 is a file copy operation, where file data is copied from flash memory 116B to buffer 105. Operation 208 is a file copy operation where file data is copied from buffer 105 to primary store 116.

Operation 209 is performed for copying file data from secondary store 110 to buffer 105. Operation 210 is performed for copying file data from buffer 105 to secondary store 110.

In one aspect of the present invention, virtual store 150 provides a mass storage system with a direct data file flash memory system and a conventional magnetic disk. This provides access to a host system access to a direct data file system flash storage device, as well as to a traditional magnetic disk.

Although the present invention has been described with reference to specific embodiments, these embodiments are illustrative only and not limiting. Many other applications and embodiments of the present invention will be apparent in light of this disclosure and the following claims.

What is claimed is:

1. A method, comprising:
   providing a file-based interface for a mass storage system to a host, the mass storage system comprising a primary storage device and a secondary storage device, the primary storage device comprising a solid-state storage device, wherein providing the file-based interface comprises:
      identifying individual files by unique file identifiers and offsets within the individual files stored within one or more of the primary storage device and the secondary storage device, the offsets configurable to reference locations within the individual files other than a beginning of the individual files;
   implementing a logical interface between the primary storage device and the secondary storage device, wherein implementing the logical interface comprises:
      mapping unique file identifiers and offsets corresponding to file data stored within the secondary storage device to a logical address space associated with the secondary storage device;
   writing data sent by the host to the mass storage system, the writing comprising:
      storing the data in the primary storage device in response to the primary storage device having space available for storing the data; and
      scheduling a copy operation for transferring data from the primary storage device to the secondary storage device, the copy operation comprising mapping a unique file identifier and offset for data copied in the copy operation to logical addresses for the copied data within the secondary storage device.

2. The method of claim 1, further comprising:
   determining whether incoming data to be written to the mass storage system should be stored in one or more of the primary storage device and the secondary storage device.

3. The method of claim 2, further comprising:
   segmenting file data such that a first segment of the file data is stored in the primary storage device and a second segment of the file data is stored in the secondary storage device.

4. The method of claim 1, wherein the secondary storage device comprises a magnetic hard disk.

5. A method, comprising:
   receiving unique file identifiers and offsets at a mass storage system comprising a first non-volatile storage device and a second non-volatile storage device, wherein:
      the first non-volatile storage device comprises a file-based interface for referencing file data by use of unique file identifiers and offsets generated by a host system; and
      the second non-volatile storage device comprises a logical interface for referencing file data by use of logical addresses of a logical address space;
   receiving a request to read file data from the mass storage system, the request comprising a unique file identifier and offset;
   determining a storage location for the requested file data by use of a file locator table of the mass storage system, the file locator table associating unique file identifiers and offsets with one or more of:
      a file identifier and offset corresponding to the file-based interface of the first non-volatile storage device; and
      a logical address corresponding to the logical interface of the second non-volatile storage device;
   in response to the file locator table associating the requested file data with the first non-volatile storage device:
      accessing the file data from the first non-volatile storage device by use of the received unique file identifier and offset; and
   in response to the file locator table associating the requested file data with the second non-volatile storage device:
      accessing the file data from the second non-volatile storage device by use of a logical address mapped to the received unique file identifier and offset; and
      scheduling a copy operation to transfer the file data to the first non-volatile storage device.

6. The method of claim 5, wherein:
a first segment of the file data is stored within the first non-volatile storage device; a second segment of the file data is stored within the second non-volatile mass storage device; and
the method further comprises transferring the first segment of the file data to the host system from the first non-volatile storage device while the second segment is being accessed from the second non-volatile storage device.

7. The method of claim 5, wherein the first non-volatile storage device comprises a solid-state memory that operates as a primary storage device.

8. The method of claim 5, wherein the second non-volatile storage device comprises a magnetic hard disk that operates as a secondary storage device.

9. A method, comprising:
providing a file-based interface to a host system at a first non-volatile mass storage device of a mass storage system, wherein providing the file-based interface comprises identifying individual files of data by unique file identifiers and offsets within the individual files stored within the mass storage system, wherein the host system generates the unique file identifiers and the offsets, and sends the file identifiers and offsets to the mass storage system, the offsets configurable to reference locations within the individual files other than a beginning of the individual files;
providing a logical interface between the first non-volatile mass storage device and a second non-volatile mass storage device of the mass storage system, wherein providing the logical interface comprises identifying file data stored within the second non-volatile mass storage device by use of logical addresses of a logical address space, and mapping the logical addresses of the file data to corresponding unique file identifiers and offsets of the file-based interface;
receiving a request to write specified file data through the file-based interface;
writing the specified file data to the first non-volatile mass storage device; and
in response to determining to segment the specified file data within the mass storage system:
copying a file segment of the specified file data to the second non-volatile mass storage device from the first non-volatile mass storage device by use of the logical interface; and
mapping a logical address associated with the file segment stored within the second non-volatile mass storage device to a corresponding unique file identifier and offset, such that the file segment stored within the second non-volatile mass storage device is capable of being referenced by the host system through the file-based interface.

10. The method of claim 9, wherein the first non-volatile mass storage device is a solid-state memory that operates as a primary storage device of the mass storage system.

11. The method of claim 9, wherein the second non-volatile mass storage device is a magnetic hard disk that operates as a secondary storage device of the mass storage system.

12. A method, comprising:
receiving a write command from a host system through a file-based interface provided by a first non-volatile mass storage device of a mass storage system, the file-based interface associating file data stored within the mass storage system with unique file identifiers and offsets, the offsets capable of referencing locations within respective files other than a beginning of the respective files;
in response to determining that space is available in the first non-volatile mass storage device for storing file data of the write command:
writing the file data in the first non-volatile mass storage device; and
in response to determining that space is not available for writing the file data in the first non-volatile mass storage device:
transferring a file from the first non-volatile mass storage device to a second non-volatile mass storage device of the mass storage system through a logical interface provided by the second non-volatile mass storage device, the logical interface assigning files to logical addresses of a logical address space, the transferring comprising:
recording mappings between logical addresses assigned to the transferred file in the logical interface of the second non-volatile mass storage device and a unique file identifier and offset for the transferred file in the file-based interface, such that the transferred file stored within the second non-volatile mass storage device is capable of being referenced by use of the unique file identifier and offset through the file-based interface provided by the first non-volatile mass storage device; and
writing the file data to the first non-volatile mass storage device in response to the transferring.

13. The method of claim 12, wherein the first non-volatile mass storage device comprises a solid-state memory that operates as a primary storage device.

14. The method of claim 12, wherein the second non-volatile mass storage device comprises a magnetic hard disk that operates as a secondary storage device.

15. The method of claim 12, further comprising:
copying a segment of the transferred file to the first non-volatile mass storage device through the logical interface provided by the second non-volatile mass storage device in response to a request from the host system received through the file-based interface, the copying comprising:
mapping a unique file identifier and offset from the request to a logical address of the logical interface provided by the second non-volatile mass storage device by use of the recorded mappings.

* * * * *